United States Patent
Taveira

(10) Patent No.: US 9,552,736 B2
(45) Date of Patent: Jan. 24, 2017

(54) SYSTEMS AND METHODS FOR RESTRICTING DRONE AIRSPACE ACCESS

(71) Applicant: QUALCOMM Incorporated, San Diego, CA (US)

(72) Inventor: Michael Franco Taveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 14/608,426

(22) Filed: Jan. 29, 2015

(65) Prior Publication Data

US 2016/0225264 A1  Aug. 4, 2016

(51) Int. Cl.

| | | |
|---|---|---|
| *G08G 5/00* | (2006.01) | |
| *H04W 4/02* | (2009.01) | |
| *H04W 48/04* | (2009.01) | |
| *G06Q 20/08* | (2012.01) | |
| *B64C 39/02* | (2006.01) | |
| *G01S 19/48* | (2010.01) | |
| *G05D 1/10* | (2006.01) | |
| *G01C 21/20* | (2006.01) | |

(52) U.S. Cl.
CPC ............ *G08G 5/006* (2013.01); *B64C 39/024* (2013.01); *G01C 21/20* (2013.01); *G01S 19/48* (2013.01); *G05D 1/102* (2013.01); *G06Q 20/085* (2013.01); *G08G 5/003* (2013.01); *G08G 5/0013* (2013.01); *G08G 5/0026* (2013.01); *G08G 5/0034* (2013.01); *G08G 5/0039* (2013.01); *G08G 5/0069* (2013.01); *H04W 4/021* (2013.01); *H04W 48/04* (2013.01)

(58) Field of Classification Search
CPC ...... G08G 5/006; G08G 5/003; G08G 5/0034; G08G 5/0026; G08G 5/0039; G08G 5/0013; G08G 5/0069; H04W 48/04; H04W 4/021; G06Q 20/085; G01C 21/20; G01S 19/48; G05D 1/102; B64C 39/024
USPC .......................................................... 701/2
See application file for complete search history.

(56) References Cited

U.S. PATENT DOCUMENTS

| | | | |
|---|---|---|---|
| 6,647,328 B2 | 11/2003 | Walker | |
| 7,127,334 B2 | 10/2006 | Frink | |
| | (Continued) | | |

FOREIGN PATENT DOCUMENTS

| | | |
|---|---|---|
| WO | 2013074843 A1 | 5/2013 |
| WO | 2014115139 A1 | 7/2014 |

OTHER PUBLICATIONS

International Search Report and Written Opinion—PCT/US2015/064719—ISA/EPO—Mar. 30, 2016.

*Primary Examiner* — Brian P Sweeney
(74) *Attorney, Agent, or Firm* — The Marbury Law Group, PLLC

(57) ABSTRACT

Methods, systems and devices are disclosed for providing access to a restricted area for a drone by a beacon device. Beacon signals including access information associated with access for the restricted area may be transmitted by the beacon device. The beacon device may receive one or more access parameters for the drone. The beacon device may compare the received one or more access parameters for the drone to the access information for the restricted area. The beacon device may determine clearance for the drone to access the restricted area based on comparing the one or more access parameter for the drone and the access information.

26 Claims, 19 Drawing Sheets

(56) References Cited

U.S. PATENT DOCUMENTS

| | | |
|---|---|---|
| 7,437,225 B1 | 10/2008 | Rathinam |
| 7,606,115 B1 | 10/2009 | Cline et al. |
| 7,782,256 B2 | 8/2010 | Smith |
| 8,059,489 B1 | 11/2011 | Lee et al. |
| 8,543,265 B2 | 9/2013 | Ekhaguere et al. |
| 8,718,838 B2 | 5/2014 | Kokkeby et al. |
| 9,079,505 B1 | 7/2015 | Hyde et al. |
| 9,146,295 B2 | 9/2015 | Jiang et al. |
| 9,317,983 B2 | 4/2016 | Ricci |
| 9,396,584 B2 | 7/2016 | Jones et al. |
| 2004/0068415 A1 | 4/2004 | Solomon |
| 2006/0106506 A1 | 5/2006 | Nichols et al. |
| 2010/0308999 A1 | 12/2010 | Chornenky |
| 2012/0143482 A1 | 6/2012 | Goossen et al. |
| 2012/0158280 A1 | 6/2012 | Ravenscroft |
| 2014/0032034 A1 | 1/2014 | Raptopoulos et al. |
| 2014/0371952 A1 | 12/2014 | Ohtomo et al. |
| 2015/0254988 A1* | 9/2015 | Wang ............... G05D 1/0214 701/3 |
| 2015/0301150 A1* | 10/2015 | Stuckman ............ G01S 1/00 342/407 |
| 2016/0117931 A1 | 4/2016 | Chan et al. |
| 2016/0253907 A1 | 9/2016 | Taveira |

\* cited by examiner

SYSTEMS AND METHODS FOR RESTRICTING DRONE AIRSPACE ACCESS

BACKGROUND

As drones become ubiquitous, the chances increase that a drone may inadvertently or intentionally fly into a restricted air space. Examples of restricted airspace include but are not limited to airports, airplane flight paths, no-fly zones, buildings/skyscrapers, military reservations, stadiums, private property, and other geographic boundaries. The Federal Aviation Administration (FAA) and state agencies continue to develop more guidelines and regulations for drone operations of all kinds (civil, commercial, recreational, etc.) in the United States. However, presently, there are no systems that effectively prevent or otherwise restrict a drone from flying into restricted air space. There is also nothing that effectively prevents drones from being flown over private property.

Because drones are conspicuous, particularly when making an approach for landing, and because the public is becoming more aware of the growing use of drones for various purposes, drones could become vulnerable to tampering. For example, the control of a drone might be intercepted or interfered with in-flight such as by intercepting, jamming, and/or imitating (e.g., pirate signals) global positioning or Global Navigation Satellite System (GNSS) signals in order to direct a drone to a surrogate landing zone. A drone may lose communications with a GNSS or other navigational system due to terrain features, dead spots, or GNSS outage, and may become lost, thereby putting the drone at risk. In some cases, repeated "hijacking" of drones in an area may lead to an inference that a particular area should be avoided. However, presently there is nothing that prevents drones from being flown into high-risk areas where hijacking is likely.

SUMMARY

The various embodiments include methods and beacon devices implementing the methods for providing conditional access by a drone to an area of restricted air space ("restricted area") controlled by a beacon device, including time-based, toll-based, access-level based and other restrictions. An embodiment method may be implemented in a beacon device may include transmitting beacon signals including access information associated with accessing the restricted area, receiving one or more access parameters associated with the drone, determining a clearance for the drone to access the restricted area based on comparing the one or more access parameters for the drone and the access information, and transmitting a signal from the beacon device to the drone indicating the determined clearance for accessing the restricted area. The beacon signals may define a boundary profile of the restricted area.

In some embodiments, transmitting beacon signals including access information associated with the restricted area may include receiving at least the access information associated with the restricted area, which may include additional information including one or more of: boundary information; time-based access restriction information; restriction level information; suggested route information; suggested corrective action information; suggested alternative route information; use restriction information; and toll payment information.

In some embodiments, receiving one or more access parameters associated with the drone may include receiving at least the one or more access parameters from a server associated with the drone. In some embodiments, transmitting a signal from the beacon device to the drone indicating the determined clearance for accessing the restricted area may include transmitting a clear for access notification from the beacon device to the drone when access to the restricted area by the drone is permitted based on comparing the one or more access parameters for the drone with the access information. In some embodiments, transmitting a signal from the beacon device to the drone indicating the determined clearance for accessing the restricted area may include transmitting an access denied notification from the beacon device to the drone when access to the restricted area is not permitted based on comparing the one or more access parameters for the drone with the access information. In some embodiments, the access denied notification may include information for the drone to take a corrective action.

In some embodiments, the information for the drone to take a corrective action may include at least one of: an instruction to land in or move to a designated area; an instruction to proceed along a designated flight path to avoid the restricted area; an instruction to return to a designated location; an instruction to prevent takeoff; an instruction to revert control of the drone to a third party; an instruction to restrict usage of the drone while in the restricted area; and an instruction to wait for a period of time.

In some embodiments, determining the clearance for the drone to access the restricted area based on comparing the one or more access parameter for the drone and the access information may include the beacon device receiving toll payment information from the drone, and processing the toll payment information. In such embodiments, transmitting a signal from the beacon device to the drone indicating the determined clearance for accessing the restricted area may include transmitting a signal from the beacon device to the drone permitting access to the restricted area in response to successful processing of the toll payment. In some embodiments, processing the toll payment information may include the beacon device forwarding the toll payment information to a server, and receiving from the server a processing result of the toll payment information processing performed in the server.

In some embodiments, the one or more access parameters for the drone may include at least one of a drone access level, a drone toll payment, a drone identification, a drone authentication, and a drone capability. In some embodiments, the access information may include conditional access restrictions, which may include at least one of: a drone access level restriction; a drone toll payment restriction; a time-based restriction; a drone identification restriction; a drone authentication restriction; a drone use restriction; a drone speed restriction; and a drone altitude restriction. In some embodiments, the one or more access parameters for the drone may include a conditional access level that is based on one or more of a capability of the drone, a qualification of the drone, an identity of an operator of the drone, a qualification of the operator of the drone, an experience level of the operator of the drone, or a maintenance history of the drone. In some embodiments, the one or more access parameters for the drone may include a conditional access level that is based on both an access level assigned to the drone and to an access level assigned to the operator of the drone.

In some embodiments, determining a clearance for the drone to access the restricted area based on comparing the one or more access parameters for the drone and the access information may include the beacon device determining a clearance for the drone to access the restricted area based on comparing a drone access level included in the one or more access parameters for the drone and with a access restriction included in the access information. In such embodiments, transmitting a signal from the beacon device to the drone indicating the determined clearance for accessing the restricted area may include transmitting a signal from the beacon device to the drone permitting access to the restricted area when the drone access level is equal to or higher than the drone access level restriction, and transmitting a signal from the beacon device to the drone denying access to the restricted area when the drone access level is lower than the drone access level restriction.

In further embodiments, methods that may be implemented in a drone may include the drone receiving beacon signals from a beacon device associated with the restricted area, the beacon signals including access information associated with the restricted area, comparing the received access information for the restricted area to one or more access parameters for the drone, and accessing the restricted area by the drone based on a result of comparing the received access information and the one or more access parameters for the drone. In some embodiments, comparing the received access information for the restricted area to one or more access parameters for the drone may include receiving, from a server associated with the drone, the result of comparing the received access information and the one or more access parameters for the drone performed in the server associated with the drone. In some embodiments, comparing the received access information for the restricted area to one or more access parameters for the drone may include comparing a restriction level in the received access information with an access level assigned to the drone, accessing the restricted area when the access level assigned to the drone is equal to or higher than the restriction level based on comparing the restriction level with the access level assigned to the drone, and taking corrective action by the drone when the access level assigned to the drone is less than the restriction level based on comparing the restriction level with the access level assigned to the drone.

In some embodiments, receiving beacon signals including access information associated with the restricted area may include the drone receiving a restriction level in the received access information that is changeable between a first restriction level and a second restriction level, and accessing the restricted area by the drone based on comparing the received conditional access information and the one or more access parameter for the drone comprises accessing the restricted area when the restriction level is changed to the first level, and not accessing the restricted area when the restriction level is changed to the second level.

In some embodiments, methods may further include taking a corrective action when the received access information does not permit access to the restricted area based on the one or more access parameters for the drone. In some embodiments, the corrective action may include returning to a designated location.

In some embodiments, accessing the restricted area by the drone based on comparing the received access information and the one or more access parameter for the drone further may include the drone providing toll payment information to one of a server; and a beacon device, receiving, by the drone, a confirmation of a toll payment with the toll payment information from the one of the server and the beacon device, and accessing the restricted area by the drone based on the received confirmation of the toll payment.

Further embodiments include a beacon device having a transceiver and a processor, which may be configured with processor-executable instructions configured to perform the operations of the embodiment methods described above. Further embodiments may include drone devices, such as quad copter drones or other drones, having a transceiver and a processor configured with processor-executable instructions to perform operations of the embodiment methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
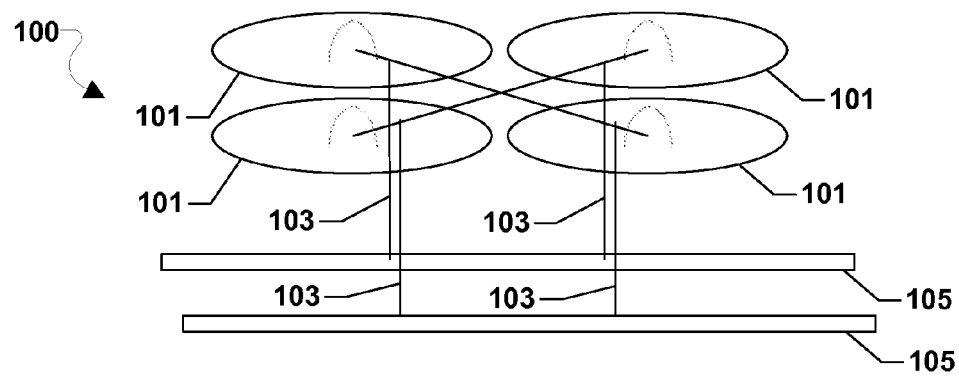
FIG. 1A-FIG. 1C are diagrams illustrating components of a drone suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments facilitate the control of access by drones to geographic areas having flight restrictions ("restricted areas"). Geographic areas may include areas defined by boundaries (airport approach paths, military bases, etc.) and the airspace above these areas, at least to a certain altitude. Geographic areas may also include particular points, such as facilities, buildings (airports, government buildings, plants, reactors, etc.) and a surrounding horizontal and vertical radius (e.g., airspace zones, altitudes). Restricted areas may have various restriction levels and conditions for access, such as a Restriction Level 0 (unrestricted access) up to a Restriction Level 10 (highly restricted). Other restriction level systems are possible. Drones may be configured with one or more of various access levels or authorizations to enter restricted areas. The various access levels may include an Access Level 0 (limited access) up to an Access Level 10 (wide access). The access level of a drone may permit or restrict access based on the various restrictions levels and conditions of the restricted areas. The access levels of the drones and the restriction levels of the restricted areas may be subject to change based on various conditions to be described in greater detail hereinafter.

Non-exhaustive and non-limiting examples of restriction levels for restricted areas may include a Restriction Level 9 for access to airports; a Restriction Level 10 for national security relevant locations, such as the White House and military bases, and a Restriction Level 6 for a city or town. In further examples, a first drone may have an Access Level 7 and a second drone may have an Access Level 5. In such an example, the first drone, with an Access Level 7, would have a sufficient access level to access areas with Restriction Level 7 and below (e.g., cities, but not airports or military facilities). However, the second drone, with an Access Level 5, would not have a sufficient access level to fly through any of the above areas, but may be permitted to fly through areas with a Restriction Level 5 or below.

In various embodiments, restriction levels may also correspond to distances by which the drone is required to avoid the restricted areas. For example, a Restriction Level 10 for a restricted area may require a drone to clear the restricted area by at least 1 mile and/or 3000 feet in altitude (if possible). A Restriction Level 2 for a restricted area may require a drone to clear the restricted area by a horizontal distance of 50 feet and/or a minimum altitude of 20 feet above a reference point, such as the tallest structure or feature in the area. Further, in various embodiments, certain restricted areas may require a drone to provide identification, such as a drone identifier or operator identifier, in order to gain access. In such examples, a drone can send identification, which may include an assigned drone access level, to a server that may be used to determine access for the drone to the particular restricted area. Upon validating the drone identification, the server may be configured to update a database of restricted areas maintained or accessible to the drone. Additionally or alternatively, a database maintained by a server associated with the restricted area may be updated to add the drone as an access authorized drone. Once identified and authorized, the server may permit access by that drone to such a restricted area to allow access to certain recognized drones.

In some embodiments, restricted areas may allow conditional access by drones. For example, restricted access to the restricted area may require reduced or modified functionality of the drone, as compared to the functionality available to the drone when outside the restricted area. For example, a drone may be granted conditional access to the restricted area, provided that data collection by the drone is disabled (e.g., video/photo recording is disabled) while within the restricted area. In other examples, the drone may be required to reduce speed and/or fly in a "silent" mode while in the restricted area. In other examples, the drone may be required to maintain an altitude minimum. Combinations of conditions may also be implemented. For example, drones with an Access Level 10 may be free to collect data, and fly at low altitudes, while drones with an Access Level 1 may be more heavily restricted and may be required to fly at a higher altitude, with no data collection and only during particular times. Other conditions are possible as will be described.

In various embodiments, in addition to or in lieu of other access restrictions, a drone may be assessed a toll or a charge to pass through a restricted area. The toll or charge may be based on time spent in the restricted area, distance traveled, time of day, actions performed, size of drone, noise/nuisance created by drone, and/or other factors. The toll or charge may be variable based on such conditions. The toll may be charged on a per-access basis or on a usage basis (e.g., per hour, per mile, etc.). In other embodiments, the toll may be charged in the form of a subscription service that tallies accesses and provides a monthly charge to the drone operator, or that allows unlimited access for a fee. In some embodiments, toll collection may functions in a manner similar to vehicle roadway toll collection (e.g., "EZ Pass," etc.). Based on data associated with toll charges and other conditions for access to certain restricted areas, a drone, or a server managed by a drone operator and communicating with the drone, may be configured to determine whether to avoid a restricted area or whether access through the restricted area is more efficient (e.g., fuel cost for avoidance vs. toll charge). In some embodiments, emergency situations may require passage through the restricted area regardless of toll charges. For example, avoiding a toll charging restricted area may mean that the drone will not have enough fuel or energy to reach a destination or otherwise complete a mission. In such situations, passage through the restricted area may occur, even with a toll charge that would ordinarily trigger avoidance of the area.

In other embodiments, the charges may be applied based on resources used or leveraged by the drone in addition to or in lieu of charges required for access to the airspace. For example, the restricted area may apply charges or additional charges to the drone based on the drone using a server accessible from the restricted area. Communication through the local server may provide more efficient communication for the drone as compared to communications between the drone and a distant drone command center. The local server may also provide enhanced area specific information for the drone. The restricted area may also apply charges to the drone based on the drone recharging/refueling at a charging/fueling facility within the restricted area. In other embodiments, the owner of restricted area may pay or provide incentives for the drone or drone operator to avoid the area on a per access basis or at all or some times.

In the various embodiments, drone access restriction and control may be further facilitated by beacons that may be deployed within restricted areas. The drone may be configured to avoid areas in which a certain beacon signal is received. For example, a beacon signal may be transmitted by a beacon device provided in areas in which drones are not desired (e.g., over private property). Regardless of whether these areas have been identified to the drone, such as through a database or list of restricted areas maintained by the drone, a server accessible to the drone, or a combination thereof, a beacon may provide additional access restrictions. When the drone detects the beacon signal, the drone may take certain actions depending on the information that is included in the beacon signal. For example, if the beacon signal contains only an indication that the area is restricted, the drone may take corrective action such as by leaving the restricted area, landing in or moving to a designated area, proceeding along a designated path to avoid the restricted area, returning to a designated location, preventing takeoff, reverting control of the drone to a third party, restricting usage of the drone while in the area, waiting for a period of time, and so on. In some embodiments, the beacon signal itself may identify the area as restricted and the signal range may demark the extent of the restricted area. In such examples, the drone may receive a beacon signal that an area is restricted and, in response, may proceed in a direction away from the beacon signal, such as by detecting that the beacon signal strength is decreasing. In other examples, the beacon signal may contain information about the coordinates of the restricted area controlled by the beacon. As will be described in greater detail the beacon may provide additional information to enable additional features, such as providing information about conditional restrictions (e.g., time of day, use, altitude, etc.), suggested alternative routes, or suggested routes through the restricted area, and so on. Alternatively or additionally, the beacon signal may contain information that may prompt the drone for identification to allow only authorized drones into the restricted area controlled by the beacon, or provide conditional access based on the access level of the drone, and so on.

In the various embodiments, different beacons may provide different restriction levels to their restricted areas. For example, a first beacon may provide a Restriction Level 6 and a second beacon may provide a Restriction Level 7 for respective restricted areas. The beacon restriction levels may change over time. For example, the first beacon may change the restriction level from a Restriction Level 6 during the daytime to a Restriction Level 4 at night. A beacon may be configured to allow a selected drone, such as a drone owned by the owner of the beacon/property, while restricting access to other drones owned/operated by others. Beacons may further be configured to take control over the drone, such as to cause the drone to take corrective action, send the drone home back to a drone base, force the drone to land, and so on. Additional corrective actions may include, landing in or moving to a designated area, proceeding along a designated path to avoid the restricted area, returning to a designated location, preventing takeoff, reverting control of the drone to a third party, restricting usage of the drone while in the area, waiting for a period of time, and so on. The beacon may be configured to communicate with the drone through point-to-point wireless communications (e.g., Bluetooth, WiFi, LTE-Direct, etc.).

In further embodiments, in addition to avoiding restricted areas, a drone may be configured to avoid certain detected objects including objects detected by the drone, a command center, or a third-party device (e.g., air traffic control tower, etc.). In one example, a control tower may detect that an airplane is near the drone. In response, the drone may be configured to take corrective action to avoid the airplane. A confidence level may be associated with detected objects. The confidence levels may be provided as an additional input for determining whether the drone should take corrective action. In an example, information from an air traffic control tower indicating that a plane is nearby may be associated with a confidence level 10 (maximum level), which may require immediate corrective action. Object detection information generated by the drone may be associated with a confidence level of 8, and the drone may collect further information before taking corrective action.

Drones may become subject to in-flight tampering with drone navigation, such as GNSS signal tampering through pirate signals, jamming signals. Alternatively or in addition, drones may become subject to disruption of navigation through natural interference. Therefore in various embodiments, the drone may be configured to periodically check the functionality of systems, such as but not limited to GPS and memory systems upon which navigation information is provided, to detect and avoid the influence of tampering or navigation failures. For example, if the drone detects that the GPS or navigation system is not functioning correctly, the drone may assume it is in a suspect area and, in response, may take corrective action (e.g., return home, land, wait for GPS to respond, etc.). When navigational information, such as information of restricted areas is stored on a server, the drone may be configured to provide and/or detect a periodic ping or "heart beat" signal. In other words, the drone may be configured to sense a heart beat signal from the server and/or vice versa that is indicative of systems functioning correctly. In response to a failure to detect the heart beat, the drone may be configured to take corrective action.

In embodiments such as beacon embodiments, the drone may use an alternate source of positioning signals (i.e., other than GNSS, GPS, etc.). Because drones may often fly at low altitudes (e.g., below 400 feet), the drone may scan for local radio signals (e.g., WiFi signals, Bluetooth signals, Cellular signals, etc.) associated with transmitters (e.g., beacons, WiFi access points, Bluetooth beacons, Pico cells, Femto cells, etc.) having known locations such as beacons or other signal sources within restricted or unrestricted areas near the flight path. The drone may use location information associated with the source of the alternate signals together with additional information (e.g., dead-reckoning in combination with last trusted GNSS location, dead-reckoning in combination with location of the drone truck or take-off zone, etc.) for positioning and navigation. Thus, in some embodiments the drone may navigate using a combination of navigation techniques, including dead-reckoning, camera-based recognition of the land features below the drone (e.g., recognizing a road, landmarks, highway signage, etc.), etc., which may be used instead of or in combination with GNSS location determination and triangulation or trilateration based on known locations of detected wireless access points. Such alternative navigation may become important during an attempted hijack situation as previously described.

As used herein the term "drone" may refer to an unmanned aerial vehicle associated with a "drone operator." A drone may be autonomous (self-navigating), remotely controlled, server controlled, beacon controlled, or may be controlled by a combination of control methods. A drone may be used for various purposes such as to perform aerial surveillance, to monitor weather, to perform a communication relay function, to perform data collection, to deploy various commercial and military systems, deliver packages or other purposes. A drone may be owned and operated by a "drone operator," which may include an individual, a commercial or civil operator, or another private, public, or commercial third party.

As used herein, the terms "area," "geographic area," "restricted access area," "restricted area," may refer interchangeably to various manners of delineating or denoting area or space. For example, an area as used herein may denote a general area such as a street address or a single point location, such as a GPS coordinate. The area for a point or location may also include a radius around the point or location including a vertical radius extending into the airspace above the point or location. An area may also refer to a series of points, which may be denoted by coordinates such as GPS coordinates. The series of points may mark a linear, circular, or irregular boundary. An area may further refer to airspace above land. A restricted area therefore may be the land denoted by the boundary or location and the airspace directly above and extending to a certain altitude above the designated land (e.g., including buildings, obstructions, terrain features, etc.) denoted by the boundary or location. An area may also refer to a radio signal range area for a signal emitted by a radio beacon. An area may also refer to an area designated by location or boundary information transmitted from a beacon that extends beyond the range of the beacon signal.

As used herein, the term Global Navigation Satellite System (GNSS) refers to any of a variety of satellite-aided navigation systems, such as Global Positioning System (GPS) deployed by the United States, GLONASS used by the Russian military, and Galileo for civilian use in the European Union, as well as terrestrial communication systems that augment satellite-based navigation signals or provide independent navigation information.

As used herein, the term "beacon" may refer to a device that transmits, or otherwise emits a beacon signal or signals. Beacon signals may be received by a drone within a range of the beacon. As used herein, a beacon may transmit signals indicating that an area in which the beacon is located is a restricted access area, or restricted area. The range of the beacon signal may delineate the restricted area. The beacon signal may contain information that designates a restricted area independently of the range of the beacon signal. The area restricted by the beacon and delineated in information in the beacon signals may extend beyond the range of the beacon signals or the beacon signals may extend beyond the area designated as restricted by the information in the beacon signals.

The various embodiments may be implemented using a variety of drone configurations. A flight power source for a drone may be one or more propellers that generate a lifting force sufficient to lift the drone (including the drone structure, motors, electronics, and power source) and any loads that may be attached to the drone. The flight power source may be powered by an electrical power source such as a battery. Alternatively, the flight power source may be a fuel-controlled motor, such as one or more internal combustion motors. While the present disclosure is directed to examples of electric motor controlled drones, the concepts disclosed herein may be applied equally to drones powered by virtually any power source. Flight power sources may be vertical or horizontally mounted depending on the flight mode of the drone. A common drone configuration suitable for use in the various embodiments is a "quad copter" configuration. In an example quad copter configuration, typically four (or more or fewer) horizontally configured rotary lift propellers and motors are fixed to a frame. The frame may include a frame structure with landing skids that supports the propulsion motors, power source (e.g., battery), payload securing mechanism, and so on. A payload may be attached in a central area underneath the frame structure platform of the drone, such as in an area enclosed by the frame structure and skids underneath the flight power sources or propulsion units. A quad copter-style horizontal rotor drone may fly in any unobstructed horizontal and vertical direction or may hover in one place. In the examples described herein, a quad copter drone configuration is used for illustrative purposes. However, other drone designs may be used.

A drone may be configured with processing and communication devices that enable the device to navigate, such as by controlling the flight motors to achieve flight directionality and to receive position information and information from other system components including beacons, servers, access points, and so on. The position information may be associated with the current drone position, way points, flight paths, avoidance paths, altitudes, destination locations, locations of charging stations, etc.

An example drone 100 configured to fly to a location or destination including accessing restricted areas according to various embodiments is illustrated in FIGS. 1A through 1D. In a simple example embodiment illustrated in FIG. 1A, the drone 100 may include a number of rotors 101, a frame 103 and landing skids 105. The frame 103 may provide structural support for the motors associated with the rotors 101, the landing skids 105 and may be sufficiently strong to support the maximum load weight for the combination of the components of the drone and, in some cases, a payload 109. For ease of description and illustration, some detailed aspects of the drone 100 are omitted such as wiring, frame structure interconnects or other features that would be known to one of skill in the art. For example, while the drone 100 is shown and described as having a frame 103 having a number of support members or frame structures, the drone 100 may be constructed using a molded frame in which support is obtained through the molded structure. In the illustrated embodiments, the drone 100 has four of the rotors 101. However, more or fewer than four rotors 101 may be used.

Figure 1B:
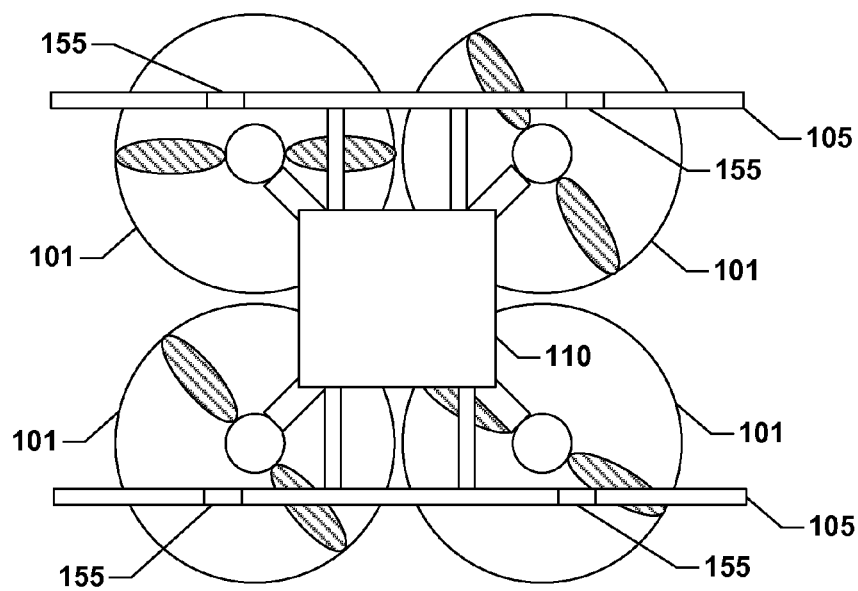

As illustrated in FIG. 1B, the landing skids 105 of the drone 100 may be provided with landing sensors 155. The landing sensors 155 may be optical sensors, radio sensors, camera sensors or other sensors. Alternatively or additionally, the landing sensors 155 may be contact or pressure sensors that may provide a signal that indicates when the drone 100 has made contact with a surface. In some embodiments, the landing sensors 155 may be adapted to provide the additional ability to charge a drone battery when the drone 100 is positioned on a suitable landing pad, such as through charging connectors. In some embodiments, the landing sensors 155 may provide additional connections with a landing pad, such as wired communication or control connections. The drone 100 may further include a control unit 110 that may house various circuits and devices used to power and control the operation of the drone 100, including motors for powering rotors 101, a battery, a communication module and so on.

Figure 1C:
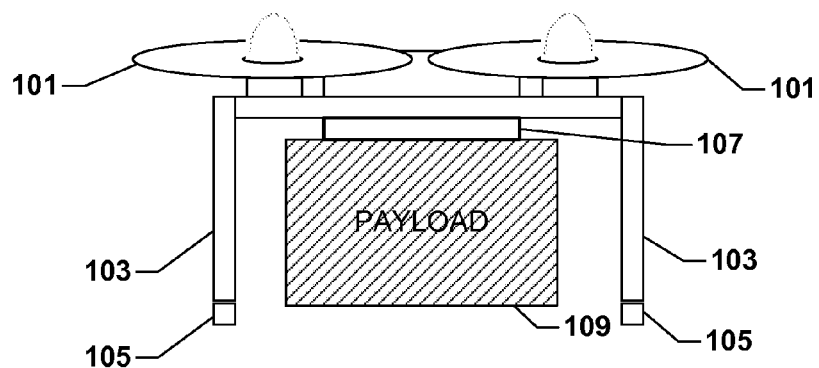

As illustrated in FIG. 1C, the drone 100 may further be equipped with a payload-securing unit 107. The payload-securing unit 107 may include an actuator motor that drives a gripping and release mechanism and related controls that are responsive to a control unit to grip and release the payload 109 in response to commands from the control unit.

Figure 1D:
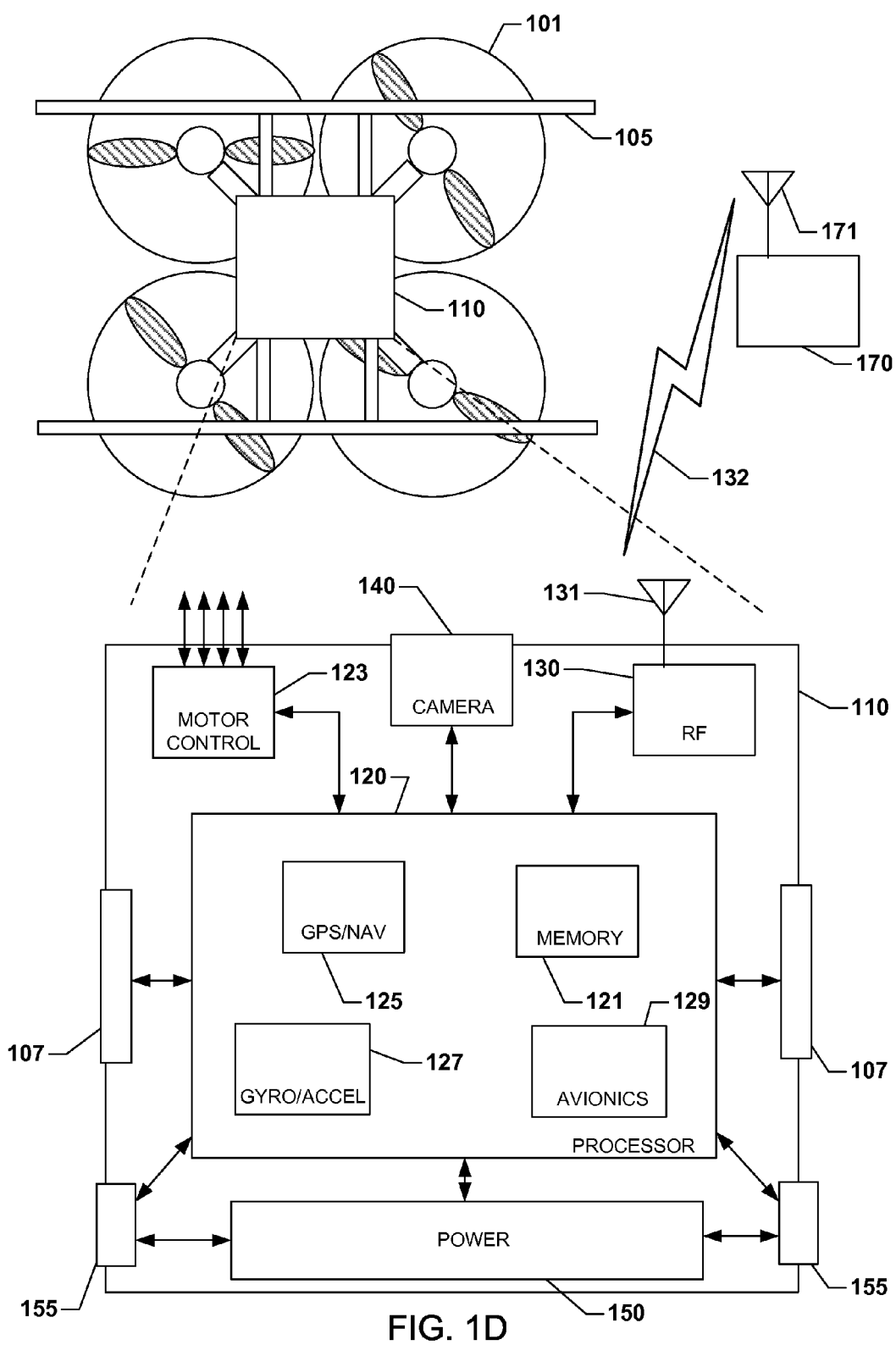
FIG. 1D is a diagram illustrating electrical and electronic components of a typical drone including a wireless communication receiver suitable for use in the various embodiments.

An example of a control unit 110 for a drone 100 suitable for use with the various embodiments is illustrated in FIG. 1D. The control unit 110 may include a processor 120, a radio module 130, and a power module 150. The processor 120 may include or be coupled to a memory unit 121 and a navigation unit 125. The processor 120 may be configured with processor-executable instructions to control flight and other operations the drone 100, including operations of the various embodiments. The processor 120 may be coupled to the payload securing unit 107 and the landing sensors 155. The processor 120 may be powered from a power module 150, such as a battery. The processor 120 may be configured with processor-executable instructions to control the charging of the power module 150, such as by executing a charging control algorithm using a charge control circuit. Alternatively or additionally, the power module 150 may be configured to manage its own charging. The processor 120 may be coupled to a motor control unit 123 that is configured to manage the motors that drive the rotors 101.

Through control of the individual motors of the rotors 101, the drone 100 may be controlled in flight as the drone progresses toward a destination. The processor 120 may receive data from the navigation unit 125 and use such data in order to determine the present position and orientation of the drone 100, as well as the appropriate course towards the destination. In some embodiments, the navigation unit 125 may include a GNSS receiver system (e.g., one or more GPS receivers) enabling the drone 100 to navigate using GNSS signals. Alternatively or in addition, the navigation unit 125 may be equipped with radio navigation receivers for receiving navigation beacon or other signals from radio nodes, such as navigation beacons (e.g., VOR beacons), WiFi access points, cellular network sites, radio station, etc. Additionally, the processor 120 and/or the navigation unit 125 may be configured to communicate with a server through a wireless connection (e.g., a cellular data network) to receive data useful in navigation as well as provide real-time position reports. An avionics module 129 coupled to the processor 120 and/or the navigation unit 125 may be configured to provide flight control-related information such as altitude, attitude, airspeed, heading and similar information that the navigation unit 125 may use for navigation purposes, such as dead reckoning between GNSS position updates. The avionics module 129 may include or receive data from a gyro/accelerometer unit 127 that provides data regarding the orientation and accelerations of the drone 100 that may be used in navigation calculations.

The radio module 130 may be configured to receive navigation signals, such as beacon signals from restricted areas, signals from aviation navigation facilities, etc., and provide such signals to the processor 120 and/or the navigation unit 125 to assist in drone navigation. In some embodiments, the navigation unit 125 may use signals received from recognizable RF emitters (e.g., AM/FM radio stations, WiFi access points, and cellular network base stations) on the ground. The locations, unique identifiers, single strengths, frequencies, and other characteristic information of such RF emitters may be stored in a database and used to determine position (e.g., via triangulation and/or trilateration) when RF signals are received by the radio module 130. Such a database of RF emitters may be stored in the memory unit 121 of the drone 100, in a ground-based server in communication with the processor 120 via a wireless communication link, or in a combination of the memory unit 121 and a ground-based server. Navigating using information about RF emitters may use any of a number of conventional methods. For example, upon receiving an RF signal via the radio module 130, the processor 120 may obtain the signals unique identifier (e.g., a service sector identification (SSID), a media access control (MAC) address, radio station call sign, cell ID, etc.), and use that information to obtain the ground coordinates and signal strength of the detected RF emitter from the database of RF emitter characteristics. If the database is stored in the onboard memory unit 121, the processor 120 may use the emitter identifier information to perform a table look up in the database. Alternatively or in addition, the processor 120 may use the radio module 130 to transmit the detected RF emitter identifier to a Location Information Service (LIS) server, which may return a location of the RF emitter obtained an RF emitter location database. Using the RF emitters coordinates and optionally the signal strength characteristics, the processor 120 (or the navigation unit 125) may estimate the location of the drone 100 relative to those coordinates. Using locations of three or more RF emitters detected by the radio module 130, the processor may determine a more precise location via trilateration. Estimates of location based on received ground-based RF emitters may be combined with position information from a GNSS receiver to provide more precise and reliable location estimates than achievable with either method alone.

The processor 120 may use the radio module 130 to conduct wireless communications with a variety of wireless communication wireless communication devices 170 such as beacon, a server, smartphone, tablet, or other device with which the drone 100 may be in communication. A bi-directional wireless communication link 132 may be established between transmit/receive antenna 131 of the radio module 130 and transmit/receive antenna 171 of the wireless communication device 170. For example, the wireless communication device 170 may be a beacon that controls access to a restricted area as described herein. In an example, the wireless communication device 170 may be a cellular network base station or cell tower. The radio module 130 may be configured to support multiple connections with different wireless communication devices 170 having different radio access technologies. In some embodiments, the wireless communication device 170 may be connected to a server or provides access to a server. In an example, the wireless communication device 170 may be a server of a drone operator, a third party service (e.g., package delivery, billing, etc.), or an operator of a restricted area. The drone 100 may communicate with a server through an intermediate communication link such as one or more network nodes or other communication devices.

In some embodiments, the radio module 130 may be configured to switch between a cellular connection and a WiFi connection depending on the location and altitude of the drone 100. For example, while in flight at an altitude designated for drone traffic, the radio module 130 may communicate with a cellular infrastructure in order to maintain communications with a server (e.g., 170). An example of a flight altitude for the drone 100 may be at around 400 feet or less, such as may be designated by a government authority (e.g., FAA) for drone flight traffic. At this altitude, it may be difficult to establish communication with some of the wireless communication devices 170 using short-range radio communication links (e.g., Wi-Fi). Therefore, communications with other wireless communication devices 170 may be established using cellular telephone networks while the drone 100 is at flight altitude. Communication between the radio module 130 and the wireless communication device 170 may transition to a short-range communication link (e.g., Wi-Fi or Bluetooth) when the drone 100 moves closer to the wireless communication device 170.

In the various embodiments, the wireless communication device 170 may be associated with an area in which drone operations are prohibited or restricted, referred to generally as a "restricted area." For example, the wireless communication device 170 may be a beacon device that emits a navigation signal identifying or indicating the restricted area. As another example, the wireless communication device 170 may be wireless access point or cellular network base station coupled to a server associated with the restricted area. The server may use the wireless communication device 170 to communicate with the drone 100 when the drone 100 is in or near the restricted area, or send coordinates of the restricted area to the drone 100 through a data connection established with the drone 100 (e.g., through a cellular data connection maintained by the drone 100 with a cellular network).

The wireless communication device 170 may also be a server associated with the operator of the drone 100, which communicates with the drone 100 through a local access node or through a data connection maintained through a cellular connection.

While the various components of the control unit 110 are illustrated in FIG. 1D as separate components, some or all of the components (e.g., the processor 120, the motor control unit 123, the radio module 130, and other units) may be integrated together in a single device or module, such as a system-on-chip module.

Figure 2A:
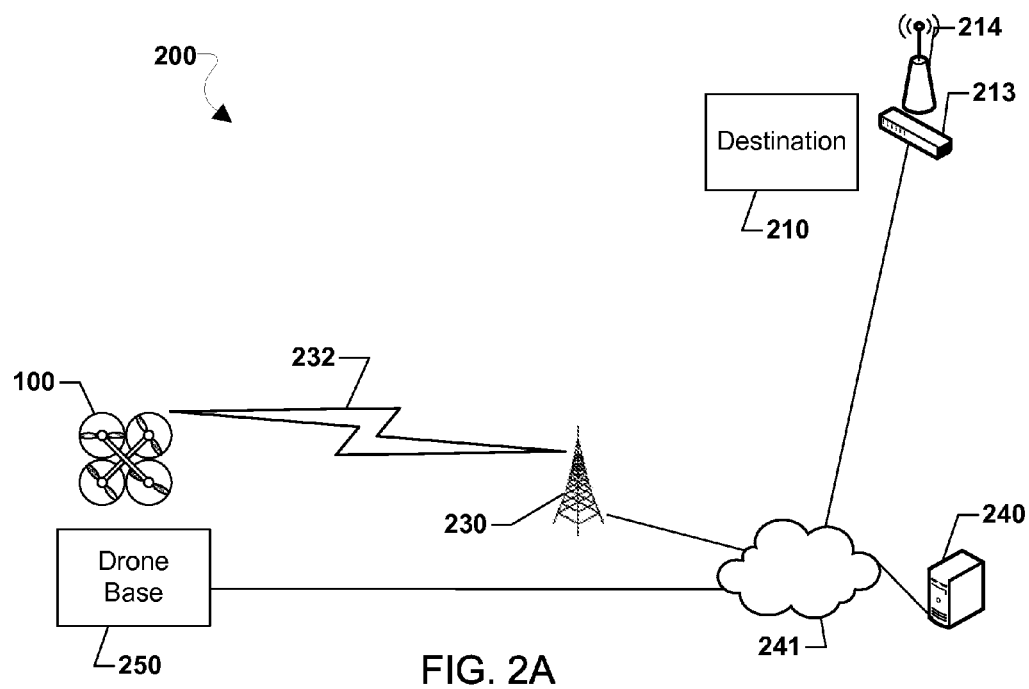
FIG. 2A-FIG. 2B are diagrams illustrating communication links in a drone system between a drone and system components in the various embodiments.
Figure 2B:
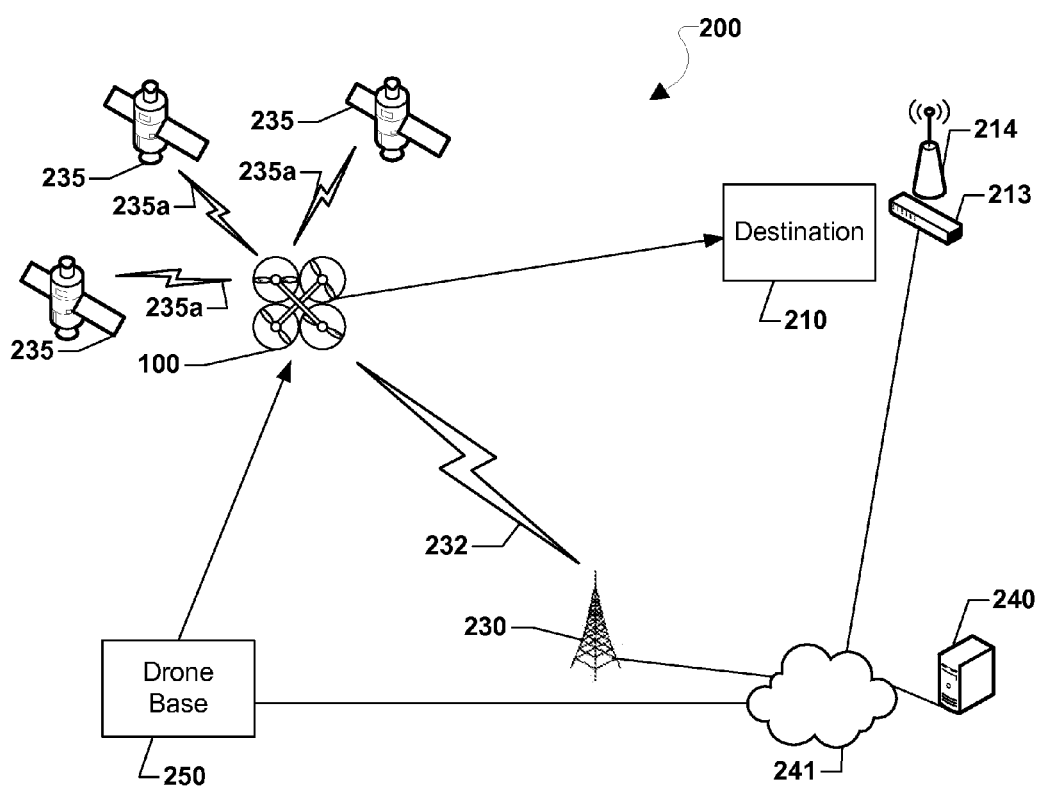
Figure 2C:
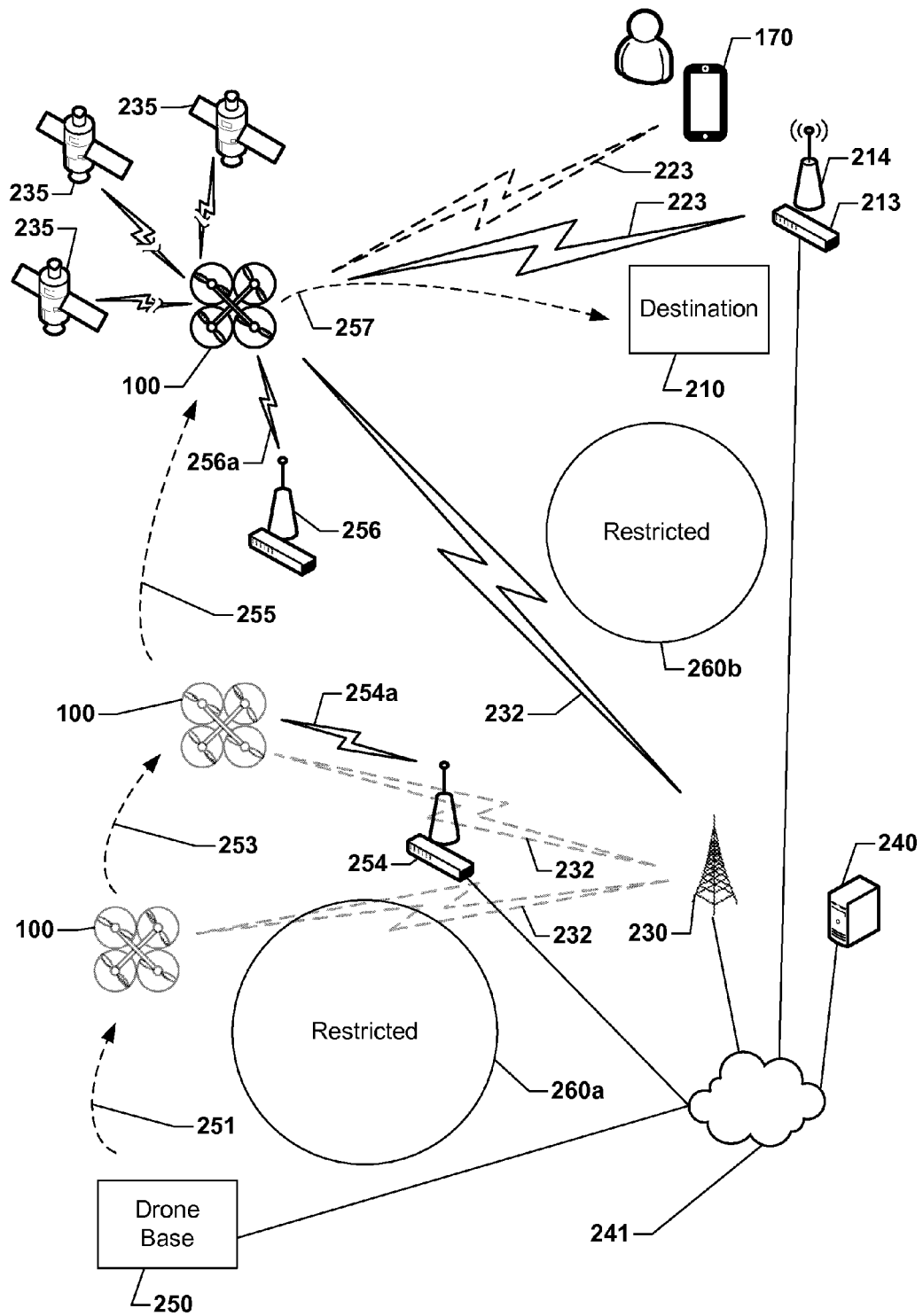
FIG. 2C is a diagram illustrating communication links and navigation links in a drone system between a drone and system components while near restricted areas in the various embodiments.

The operating environment 200 for a drone (e.g., the drone 100 in FIGS. 1A-1D) may include a destination 210 and a drone base 250 as illustrated in FIG. 2A through FIG. 2C. The drone base 250 may be a "home" location for the drone 100 or any predetermined or designated starting point for a transit by the drone 100. The drone base 250 may also be a predetermined or designated area to which the drone 100 may be configured to return. With reference to FIGS. 1A-2C, the coordinates of the destination 210 may be provided to the drone 100 by a server 240 (e.g., wireless communication device 170). In some embodiments, the drone 100 may be programmed with the coordinates of its destination 210, such as when the drone 100 is assigned for a mission or while the drone 100 is in flight. In some embodiments, the destination 210 may be coordinates of a loiter location where the drone 100 may proceed to and maintain monitoring or other operations within the area of the destination 210.

The drone 100 may establish and maintain communication with the server 240 while the drone 100 is at the drone base 250 to facilitate the dispatch of the drone 100 to the destination 210. In various embodiments, the drone 100 may establish a direct connection with the server 240 while at the drone base 250 and/or may communicate with the server 240 through a cellular data network connection. For example, the drone 100 may establish a wireless connection 232 with a cellular infrastructure component 230 of a cellular service provider. The wireless connection 232 may be a data connection that provides a connection with the server 240 through a public network, such as the Internet 241, while the drone 100 is on the ground and/or in flight. The drone 100 may establish multiple wireless connections simultaneously, such as a wireless connection 223 with a wireless access point 213 having an antenna 214. The wireless access point 213 may provide an independent connection to the Internet 241 through which the drone processor 120 may access the server 240. The wireless access point 213 may be any wireless access point between the drone base 250 and the destination 210, include a beacon associated with a restricted area.

Upon receiving information regarding the destination 210 for the drone 100, the drone 100 may be dispatched from the drone base 250 to fly to the destination 210. The drone 100 may determine the route to the destination 210 based on various constraints, such as ground safety considerations, altitude restrictions, obstacles (e.g., buildings, mountains, towers, etc.), weather conditions, retrievability considerations, efficiencies (e.g., most fuel efficient route, shortest distances to travel), and the need to avoid restricted areas 260. For example, in the event the drone 100 lands or crashes while traveling to or from its destination, the drone 100 may be configured to do so in an area that will be least likely to cause safety issues to humans or damage to property, and/or in an area where it can be most easily retrieved, and so on. The drone 100 may use GNSS signals 235a from GNSS satellites 235 to determine progress toward the destination 210 of the drone 100, including progress towards way points defining the planned flight path of the drone 100.

The drone 100 may establish the connection 232 with the cellular infrastructure component 230 to facilitate communications with the server 240 through the Internet 241 while in flight. In various embodiments, the drone 100 may use information from the server 240 to avoid entering restricted areas 260 (260a, 260b) or to gain conditional access to the restricted areas 260.

In various embodiments, the drone 100 may be configured to periodically check the functioning of the navigation unit 125 and/or communication links with the server 240. Such functionality may be checked through a periodic heart beat check. For example, the drone 100 may receive periodic communications from the server 240 indicating that the connection 232 is still maintained and viable. Alternatively or in addition, the drone 100 may send periodic communications to the server 240 providing the location coordinates of the drone 100 and/or indicating that the navigation unit 125 and other drone systems are still functioning If the processor 120 of the drone 100 determines that the navigation unit 125 and other drone systems are not functioning, corrective action may be taken. For example, in the event the drone 100 loses contact with the GNSS satellites 235, such as due to jamming, pirate signals, masking by buildings, or tampering of the drone 100, and the drone 100 has no other way to determine location, the drone 100 may issue an alert to the server 240 and land. As another example, in the event the drone 100 loses contact with GNSS satellites 235, the drone 100 may fall back to using alternative navigation methods (e.g., trilateration based on signals detected from identifiable RF emitters as described).

The drone 100 may receive signals from wireless communication devices 254, 256 (e.g., 170) through respective wireless signals 254a, 256a as the drone 100 progresses toward the destination 210. The wireless communication devices 254, 256 may be beacons that are associated with one or more restricted areas 260a, 260b. The wireless signals 254a, 256a may provide information about the respective wireless communication devices 254, 256, such as an SSID, a MAC address, a cell tower ID, etc. The wireless signals 245a, 256a may indicate to the drone 100 that the respective areas are restricted. The wireless signals 245a, 256a may contain additional information, such boundary coordinate information for the respective restricted areas and/or information regarding conditional access. One or more of the wireless signals 245a, 256a may prompt the drone 100 to provide identifying information that may include an identifier of the drone 100 and an access level for the drone 100 related to whether the drone is permitted to enter or transit the restricted areas 260a, 260b.

In some embodiments, the information in the wireless signals 245a, 256a may be used by the drone processor 120 to determine the locations of the access points or wireless communication devices 254, 256, such as by comparing the identifiers to a database of the locations of access points. For example, when the drone 100 is dispatched from the drone base 250 on a first leg 251, the drone 100 may receive information regarding a restricted area 260a from the server 240. While in flight, the drone 100 may maintain the wireless connection 232 with the server 240 through the cellular infrastructure component 230 and the Internet 241. Based on information received from the server 240, the drone 100 may avoid the restricted area 260a and proceed toward the destination 210 on a second leg 253. The drone may make contact with the wireless communication device 254 when the drone's radio module 130 begins receiving signals 245a from the wireless communication device 254. The drone 100 may determine the location of the wireless communication device 254 by obtaining identification (e.g., SSID) and possibly other information about the wireless communication device 254, and obtain the access point location by sending the obtained access point information to a server of a location information services provider. Coordinates of the wireless communication device 254 returned from the location information services provider may be used by the drone processor 120 to confirm the current location and bearing of the drone 100. In the event the determined the current location and bearing information indicates that the drone 100 is off course, the drone 100 may make course corrections as the drone 100 proceeds to the destination 210 along a third leg 255. Also, the drone processor 120 may determine that it should distrust the GNSS system-determined location as such information may be corrupted by pirate or jamming signals, and take corrective actions, such as landing, returning to drone base 250, or falling back onto dead-reckoning navigation in combination with alternative navigation. The location information determination operations may be repeated each time a new wireless communication device 256 is encountered.

In some embodiments, as the drone 100 approaches the destination 210 along a final leg 257, a communication link may be established with the wireless access point 213, and/or with a wireless device 170 at or near a landing zone. For example, the drone 100 may detect a wireless signal 223 from smart phone wireless device 170 of a person awaiting the drone 100, and conduct final location determination operations with the wireless device 170 information. Alternatively or additionally, the drone 100 may use the wireless connection 222 to establish a connection with the server 240, such as through the Internet 241 by way of the wireless device 170. Alternatively or additionally, the drone 100 may use the wireless connection 232 to establish a connection with the server 240, such as through the Internet 241 by way of a cellular infrastructure component 230. Through such connections the drone 100 may receive additional navigational, status, or other information useful for supporting flight operations including, for example, modified destination information, modified route information, weather information, distance information, flight restriction information, obstacle information, or other information that may be useful for operation of the drone 100. For example, a new destination may be assigned and the drone 100 may be required to follow a new flight path to the new destination. The new destination information may be conveyed to the drone 100 through one or more wireless connections 223, 232 along with additional information regarding restricted areas, conditional access restrictions, and so on.

Figure 3A:
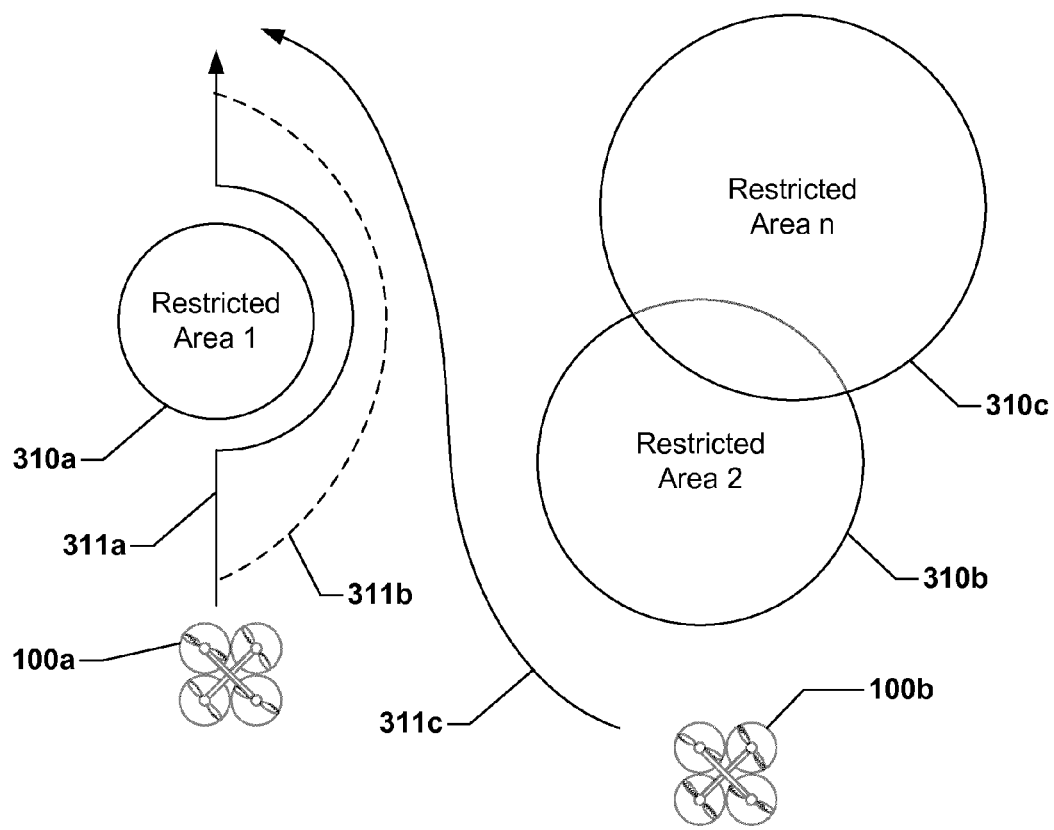
FIG. 3A-FIG. 3E are diagrams illustrating avoidance of, restricted access to, and conditional access to restricted areas by a drone in the various embodiments.

FIG. 3A illustrates some operations of a drone 100a, 100b (which may correspond to the drone 100 in FIGS. 1-2C) as the drone 100 approaches a restricted area 310a on or near a flight path 311a according to various embodiments. With reference to FIGS. 1-3A, in some embodiments, the drone 100 may have received restricted area information regarding the restricted area 310a from communications with the server 240. The drone 100 may proceed along the flight path 311a that avoids entering the restricted area 310a. For example, the restricted area information for the restricted area 310a may include an avoidance distance requiring the drone 100 to take an alternate path 311b that remains outside of the avoidance distance from the restricted area 310a.

The drone 100b may be provided with a flight path 311c that avoids all restricted areas 310a, 310b, and 310c. In some embodiments, one or more of the restricted areas 310a, 310b, and 310c may be indicated with beacons that transmit signals that are received by the drone 100 when close to the restricted areas. If the drone 100 receives information indicated that the drone 100 is within one of the restricted areas 310a, 310b, or 310c, the drone 100 may take immediate corrective action. For example, the drone 100 may change course to leave the restricted area or land immediately. Other non-exhaustive and non-limiting examples of corrective action for the drone 100 may include landing in or moving to a designated area, proceeding along a designated path to avoid the restricted area, returning to a designated location, preventing takeoff, reverting control of the drone 100 to a third party, restricting usage of the drone 100 while in the restricted area, waiting for a period of time, and so on.

Figure 3B:
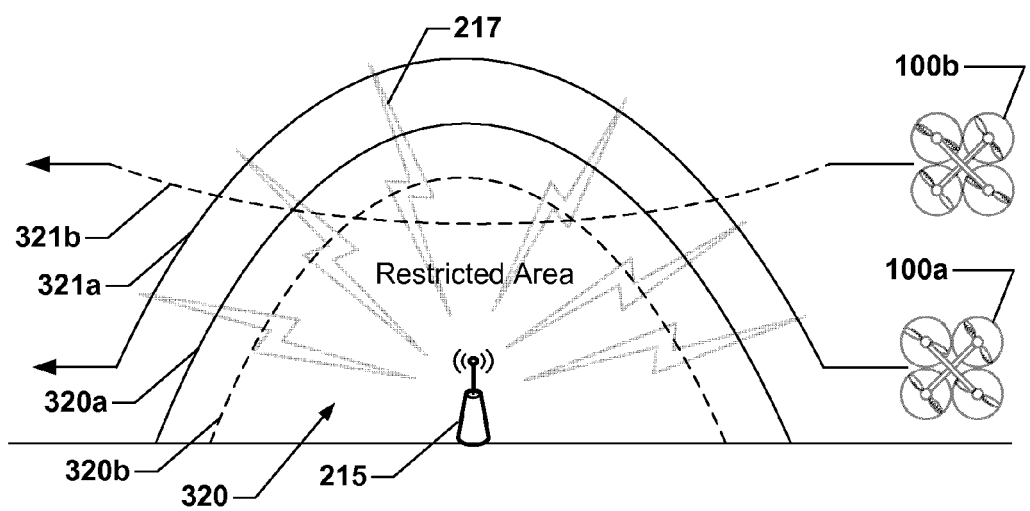

FIG. 3B illustrates some operations of a drone (e.g., 100a, 100b) subject to flight restrictions for the drone. With reference to FIGS. 1-3B, for example, a restricted area 320 may be defined with altitude restrictions that limit unauthorized drones from flying below minimum altitudes, such as altitude profiles 320a and 320b. The altitude restrictions may be indicated or defined in signals received from a server responsible for controlling drone flight paths in or over the restricted are 320. For example, altitude restrictions (e.g., a specific altitude or an altitude minimum) may be provided in information communicated to the drone 100 from a server associated with the restricted area 320.

In some embodiments, the boundaries of a restricted area 320 may be provided by a wireless beacon 215 in or on the boundary of the area. The beacon 215 may emit wireless beacon signals 217 that communicate the altitude restrictions to the drones 100a, 100b. In some embodiments, the reception range of the beacon signals 217 may delineate a boundary of the restricted area 320. In other words, a restricted area may be defined by an exclusion radius around and over a central beacon 215 defined by the distance at which the wireless beacon signals 217 may be received. Because the reception range of wireless beacon signals 217 may vary depending on time of day, weather conditions, and interference from other RF emitters, the actual boundary of the restricted area 320 may be closer to the beacon than the expected reception range of the wireless beacon signals 217. For example, the reception range of the wireless beacon signals 217 may extend up to or beyond a first altitude or altitude profile 320a while the actual altitude boundary of the restricted volume may be the altitude profile 320b.

For example, as the drone 100a approaches the restricted area 320, the drone's radio module 130 may begin to receive the wireless beacon signals 217. In response, the drone 100a may climb until it no longer receives the wireless beacon signals 217, thus proceeding along a flight path 321a over the restricted area 320 that avoids reception of the beacon signals 217. Alternatively, the drone 100a may adjust its altitude in order to follow a flight path 321a that maintains a constant signal level of the beacon signals 217. In other words, the drone 100a may navigate around and/or over the restricted area 320 so that the signal strength of the beacon signals 217 does not increase (or does not increase above a defined threshold signal value).

In some embodiments, the wireless beacon signals 217 may contain information that defines a permitted altitude or altitude profile 320*b* that the drone 100 should follow while transiting the restricted area 320. For example, the wireless beacon signals 217 may provide information to the drone 100*a* defining the restricted altitudes for the altitude profile 320*b* over the restricted area 320. The drone 100*a* may navigate based on the altitude information received in the beacon signals 217 so as to remain outside the restricted airspace over the restricted area 320.

While the altitude profiles 320*a* and 320*b* are shown, for ease of illustration as dome shaped, the shapes of permitted altitude profiles may have any shape, such cylindrical, conical, frustum (i.e., conical with a permitted altitude) or irregular shape. For example, portions of the restricted area may have a first altitude flight path restriction, while other portions of the same restricted area may have a second flight path altitude restriction. As illustrated, the drone 100*b* may fly around the restricted area 320 along a flight path 321*b* at an altitude that avoids the restricted area altitude profiles 320*a*, 320*b*.

Figure 3C:
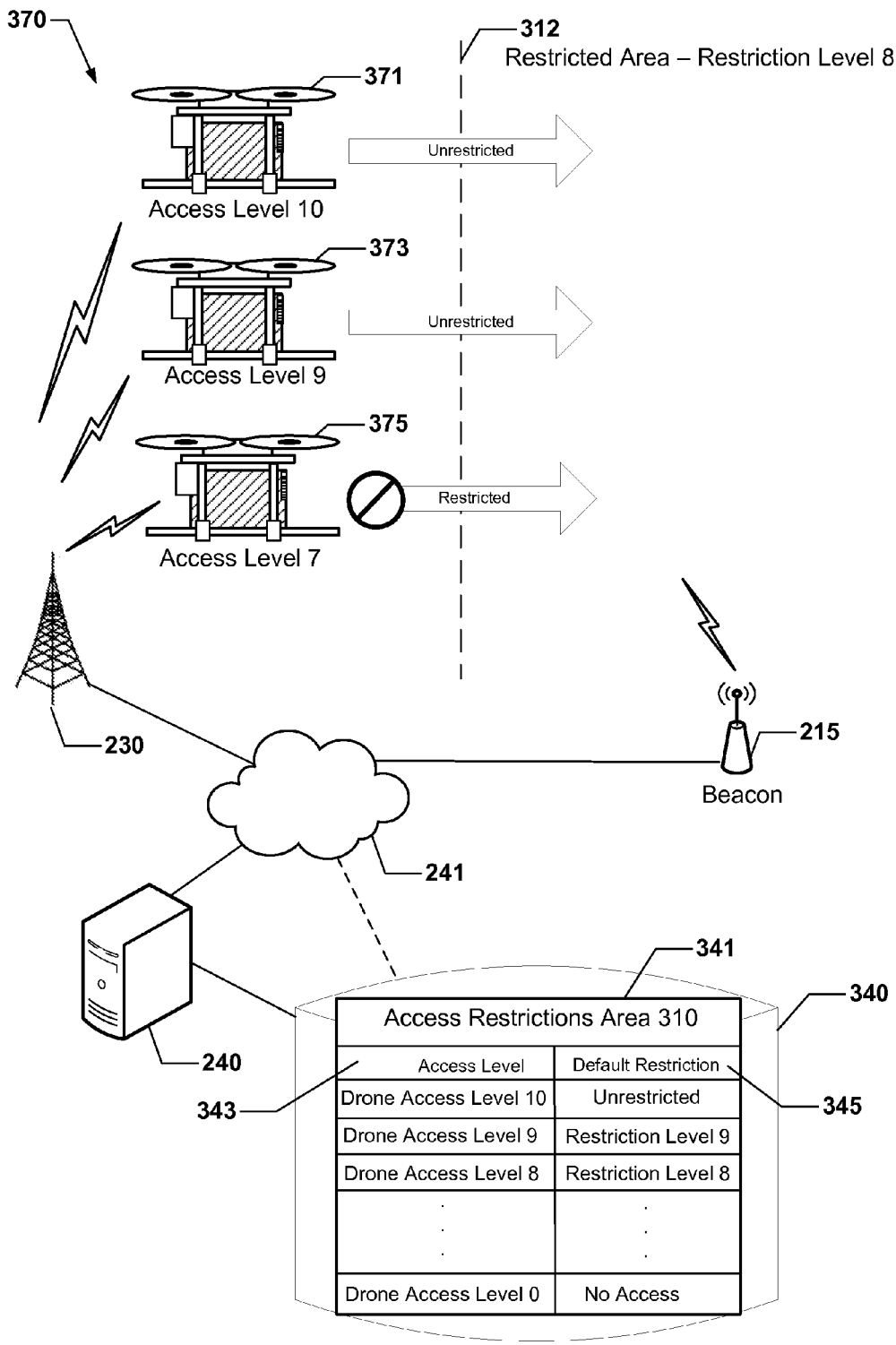

Restricted areas may also permit flyovers by drones on a conditional basis, such as based on time of day, day of week, and on an authorization or access level of a drone. FIG. 3C illustrates an environment 370 in which some operations of drones (e.g., 100, 100*a*, 100*b* in FIGS. 1-3B) in the vicinity of a restricted area 312 permit conditional access to drones with difference access levels. With reference to FIGS. 1-3C, in the illustrated example, a drone 371 with an Access Level 10, a drone 373 with an Access Level 9, and a drone 375 with an Access Level 7 encounter a restricted area 312 with a Restriction Level 8. These arbitrary restriction levels of the restricted area 312 are for illustration purposes as examples of how access levels may be used to establish a minimum access level for drones allowed to flyover restricted areas. Access conditions may change based on the relationship between the drone access level and the restriction level of the restricted area. For example, for the restricted area 312 with a Restriction Level 8, drones having an access level below Access Level 8 may be precluded from flying over or through the restricted area 312. As another example, drones may be provided different levels of access based on their access levels.

In the environment 370, two or more of the drones 371, 373, 375 may approach the restricted area 312 at the same time. While arrival at the same time may include simultaneous arrival, alternatively or additionally, two or more of the drones 371, 373, 375 may not arrive simultaneously. For example, two or more of the drones 371, 373, 375 may arrive under the same general conditions (e.g., during the same time window or period) and thus may be subject to restrictions that apply for those conditions. The drones 371, 373, 375 may be in communication with the server 240 associated with the restricted area 312, such as via the cellular infrastructure component 230, the wireless beacon 215, or another wireless access device. Communications with a server 240, for example, may be provided through the Internet 241 or directly through the wireless beacon 215. The drones 371, 373, 375 may be provided with access to a database 341 of restriction levels and altitude restrictions corresponding to various access levels. Such a database 341 may be stored on a data storage device 340, which may be coupled to or accessed via the server 240 associated with the restricted area. For ease of illustration, all of the drones 371, 373, and 375 are shown as communicating with the server 240. In the various embodiments, one or more of the drones 317, 373, and 375 may be in communication with other servers or combinations of servers to access the database 341.

In the environment 370, the database 341 maintained on the data storage device 340 that is accessible to the server 240 may include information regarding access restrictions that establish restriction levels for drones of a particular access level. For example, the database 341 may store various information regarding access levels 343. The access levels 343 may be accompanied by default restrictions 345. The default restrictions 345 may indicate the level of restriction for access to the restricted area based on an access level for a given drone. For example, a drone with an Access Level 10 value in the access levels 343 may be provided unrestricted access in the default restrictions 345. Drones with an Access Level 0 value in the access levels 343 may be provided no access in the default restrictions 345. Thus, in the environment 370, the drone 371 having an Access Level 10 may be provided with unrestricted access to the restricted area 312. The drone 373 having an Access Level 9 may also be provided with access to the restricted area 312 based on a Restriction Level 9.

Drones having a higher Access Level than the Restriction Level of the restricted area may nevertheless have access restrictions imposed. For example, if the restricted area is an active airport runway, access by drones of any Access Level may be restricted during flight operations. The drone 375 having an Access Level 7, which is below the Restriction Level 8 of the restricted area 312, may be denied over-flight access to the restricted area.

Figure 3D:
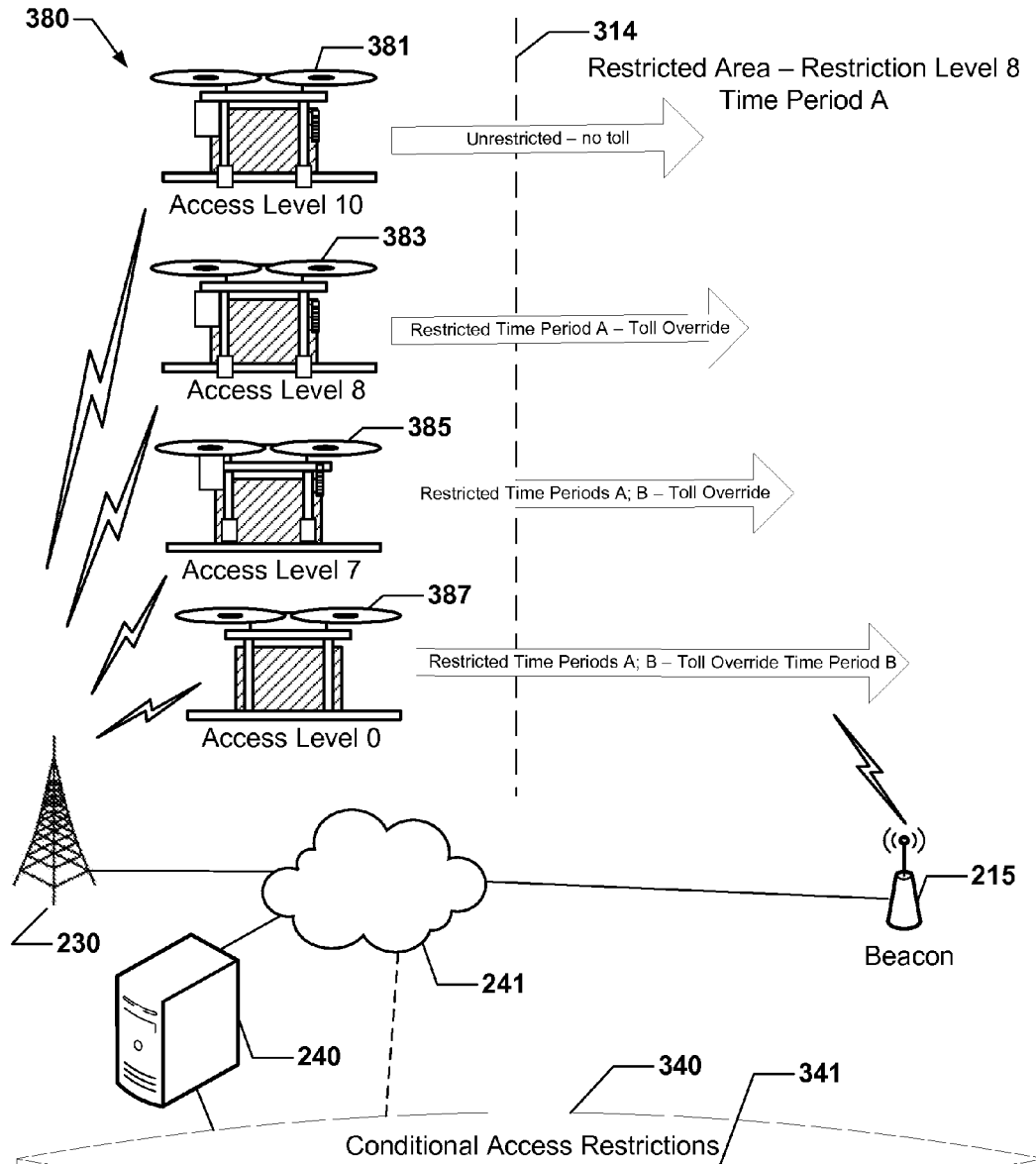

Even if a drone has an access level below the restrictions for a restricted area, a drone (e.g., 100, 100*a*, 100*b*, 371, 373, 375 in FIGS. 1-3C) may be provided conditional access to the restricted area based on time, use, authentication, or other conditions, as illustrated in environment 380 in FIG. 3D. With reference to FIGS. 1-3D, in the environment 380, a drone 381 with an Access Level 10, a drone 383 with an Access Level 8, a drone 385 with an Access Level 7, and a drone 387 with an Access Level 0 are shown approaching a restricted area 314 at the same time or different times within a Time Period A. The Time Period A may be a time window, such as a time between the hours of 10:00 AM and 3:00 PM (e.g., 1000 to 1500 hours for 24-hour time). The time window may be a non-recurring time period that is effective for a given date or series of dates. Alternatively, the Time Period A may be a recurring time window for a given time period between certain designated hours, on a particular day or days of the week or month, or combinations of the such time windows. The time window may be for certain days of the week, such as a 24 hour time period every Wednesday (e.g., from 12:00 AM Wednesday to 11:59 PM Wednesday), times of the month, such as the first Wednesday of every month, or some combination of these time periods, e.g., from 3:00 PM to 5:00 PM every first Wednesday of every month. While the illustrated examples relate to a Time Period A for the restricted area 314, other restrictions may apply at other time periods as described.

The drones 381, 383, 385, and 387 may access the database 341 via a wireless communication link to a network on which the database 341 is hosted. The database 341 may contain the conditional restrictions for the various drone Access Levels 343, including default restrictions 345 and time-based conditional access restrictions 347. For example, the database 341 may include Time Period A restrictions 347 that provide various conditional Restriction Levels for access to the restricted area 314 during the Time Period A. As an example, access to the restricted area 314 will be unrestricted during the Time Period A for drones having an Access Level 10 or 9, subject to Restriction Level 9 (which might be associated with a minimum altitude and noloitering restrictions for example) during the Time Period A for drones having an Access Level 8 or lower. Thus, for example, the drone 383, which has an Access Level 8, by default would be allowed in the restricted area 314 outside of the Time Period A (e.g., during Time Periods B and C), but not within the restricted area 314 during the Time Period A.

As another example, Time Period B restrictions 349 and Time Period C restrictions 351 may be maintained in the database 341, which provide similar conditional restrictions based on access levels. In some situations, the Time Periods A, B, and C may overlap, in which case additional conditions may be specified to instruct drones regarding the conditional restrictions that should be followed during an overlapping time window. In other words, during various defined day and time periods, drone access restrictions may be lowered such that drones may be provided with access restrictions that correspond to elevated access levels. Other restriction levels may be set in the database 341 for Time Period A restrictions 347 for providing conditional access levels to the restricted area 314 for drones with different Access Levels not specifically listed.

In further embodiments, conditional access may be granted in return for paying a toll, which is illustrated in the column Time Period Restriction Toll Override 353. In such embodiments, a drone operator may obtain access to the airspace of the restricted area 314, effectively overriding time period restrictions, by authorizing payment of a toll. Time Period Restriction Toll Override restrictions 353 may be imposed separately from the Time Period restrictions 347, 349, 351 to allow a drone operator to purchase access to the restricted area 314 that would be otherwise restricted for a particular drone. The payment of the toll may be accomplished by the drone operator communicating separately with the server 240 (or other entity), or by the drone transmitting payment information via a network to the server 240 managing the restricted area, or via wireless transmissions to a toll sensor, which may be implemented within or otherwise associated with the wireless beacon 215. In some embodiments, the drone operator may establish an account that will be charged when a drone (e.g., 383, 385, etc.) enters the restricted area 314 as may be detected by radar (e.g., with a transponder providing an identifier for the drone) or communications between a drone and the wireless beacon 215. In some embodiments, the ability to override access restrictions by paying a toll may not be available to some drones or drones with some access levels except at specified time periods, and some drones may never be permitted to access the restricted area by paying a toll. Alternatively or additionally, the toll charged to a drone operator for accessing a restricted airspace may be based upon the access level of the drone. For example, drones with higher access levels may be charged a reduced toll, drones with lower access levels may be charged an increased toll, or vice versa. Further, toll charges may be based on a combination of a variety of variables including access levels, time of date, desired use, duration of access, and so on. The information regarding access restrictions and conditional access stored in the database 341 may be communicated to the drones 381, 383, 385 and 387 as part of initial communications with the server 240 for mission or route planning. Alternatively or additionally, the conditional access information stored in the database 341 may be communicated to the drones 381, 383, 385 and 387 in flight, such as upon approaching a restricted area 314. Further, one or more of the drones 381, 383, 385 and 387 may be configured with a local drone memory and may store the conditional access database 341 or a version of the conditional access information in the database 341 in the respective local drone memories. The conditional access information may be subject to an expiration date/time. The local drone memories may be updated at the start of a mission, periodically during the mission, and/or when the conditional access information in the database 341 expires, which may relieve the drone of the need to receive at least some conditional access information from the server 240.

In embodiments in which access to the restricted area 314 is controlled by a beacon and/or a local server with which the drones 381, 383, 385 and 387 are communicating, the beacon and/or local server may prompt the drones 381, 383, 385 and 387 for identity or authentication information, toll information, Access Level information, or other information. Alternatively, the beacon and/or local server may obtain the information from a server associated with each of the drones 381, 383, 385 and 387 such as a service operator server for the service provider for the drone or drones.

The examples of access levels, access restrictions, and time periods illustrated in the environment 380 are illustrative, non-exhaustive, and non-limiting. For example, other and different access conditions may be imposed on drones in the various embodiments.

Figure 3E:
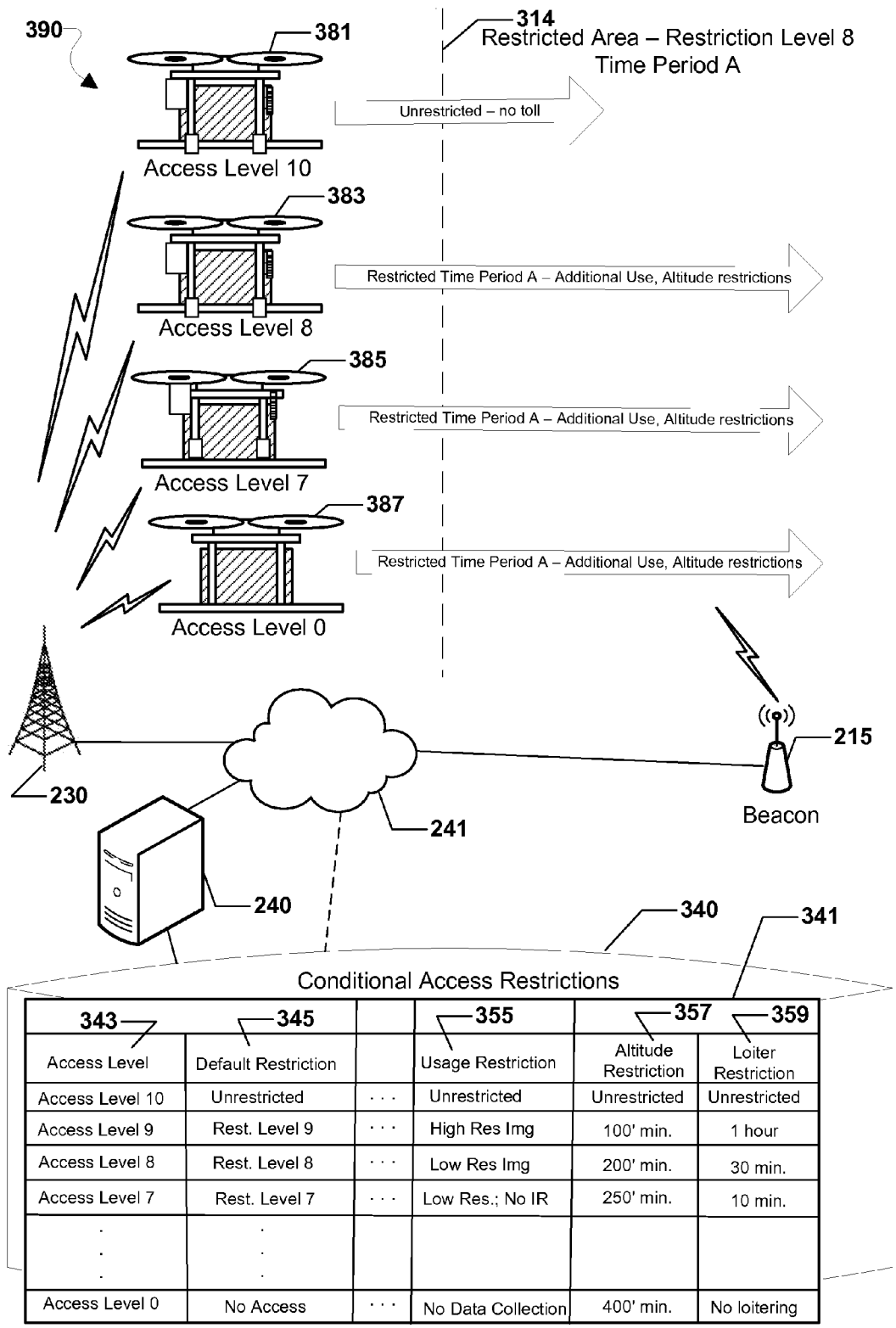

In some embodiments, conditional restrictions on access to airspace over restricted areas may include restrictions on activities that may be performed, minimum altitudes that may be used, and time limits on the amount of time that a drone is permitted to spend within the area as illustrated in environment 390 in FIG. 3E. With reference to FIGS. 1-3E, in such embodiments, the database 341 may store restrictions on use of and permitted or prohibited operations within the airspace. For example, the database 341 may contain usage restrictions 355, altitude restrictions 357, and loitering restrictions 359 imposed during a particular time period or at all times. For example, some usage restrictions 355 may place limits on the permitted types of operations that may be performed by a drone, such as taking high-resolution or low resolution imagery, or prohibiting any type of data collection. As another example, the database 340 may include specific altitude restrictions (e.g., minimum altitude restrictions), which may depend on the access level of the drone. As a further example, the database 340 may include restrictions on the amount of time that the drone can remain within the restricted area (e.g., loiter restrictions), which may depend on the access level of the drone. These examples of additional conditional access restrictions are non-exhaustive and non-limiting, and other types of restrictions may be implemented in a similar manner. In some embodiments, payment of a toll may override an additional restriction, such as paying for it permission to conduct high resolution imaging or to remain longer within the restricted area.

In various embodiments, alternatively or additionally, the database 341 may be stored in memory of a drone (e.g., 100, 100a, 100b, 371, 373, 375, 381, 383, 385, 387, or the like). The drone may receive updated database information 341 from a server (e.g., 240) at regular intervals (e.g., hourly, daily, etc.). In further embodiments, the information stored in the database 341 of the drone may have a limited useful life, which may be indicated when the information is obtained (e.g., by an expiration time). The drone may track the expiration of the database information 341 stored in the memory using a timer or the like. For example, if the database information 341 has expired or is otherwise beyond the indicated useful life, the drone processor may contact the server to reload the latest database information 341. In some cases, a drone storing expired database information 341 may not be allowed to fly in the restricted area 312. By maintaining a local version of the database information 341, the frequency of communications between the drone and the server 240 may be reduced, which may reduce overhead, traffic load, etc. Reducing the need to communicate with the server 240 may be advantageous in circumstances in which WAN connectivity or connectivity with other networks is unavailable or unreliable. In various embodiments, the drone may communicate with the server prior to taking off, upon lift off, or at other designated times in order to confirm that the latest information update for the database 341 has been loaded. Once the information is confirmed as current or updated, the drone may proceed without communications with the server 240 until the next take off event, until the expiration of the timer, or upon occurrence of some other predetermined event (e.g., query by a third party).

It should be noted that although only one server 240 is shown in the FIGS. (e.g., 2A-2C and 3C-3E), the database 341 or the information in the database 341 may be distributed among many servers 240. For example, a first portion of the database 341 may be stored and/or maintained on a first server 240, a second portion of the database 341 may be stored and/or maintained on a second server (not shown), and so on. Alternatively or additionally, the servers 240 may be redundant, so that the drone 100 may be configured to communicate with a selected one of the servers 240. The selection of the server 240 may be based on a criteria or condition, such as the proximity of the server 204 to the drone 100, the wireless link quality of the link between the server 240 and the drone 100, an affiliation or classification of the server 240 (e.g., military, government, commercial, private, etc.), a reputation of the server 240, an operator of the server 240, and so on.

In some embodiments, the database 341 information stored and/or maintained on a given server 240 can be populated by other servers (or entities) or by access to other servers (or entities). For instance, a server 240 can be configured to query or otherwise obtain event information from an entity/server associated with a restricted area in which an event may be taking place or may be scheduled to take place in the restricted area. For example, the event information may include information such as the start time of a baseball game in a baseball stadium. Accordingly, based on the event information obtained by the server 240, a restricted time window may be established for the restricted area (e.g., baseball stadium) in the database 341 that is a few hours (or other amount of time) before game time until a few hours (or other amount of time) after the game is expected to conclude. In particular embodiments, the server 240 may be configured to receive an "all clear" signal or the like from the entity/server upon completion of the game or when access is now available or otherwise changed. The server 240 may then update the database 341 accordingly.

Figure 4A:
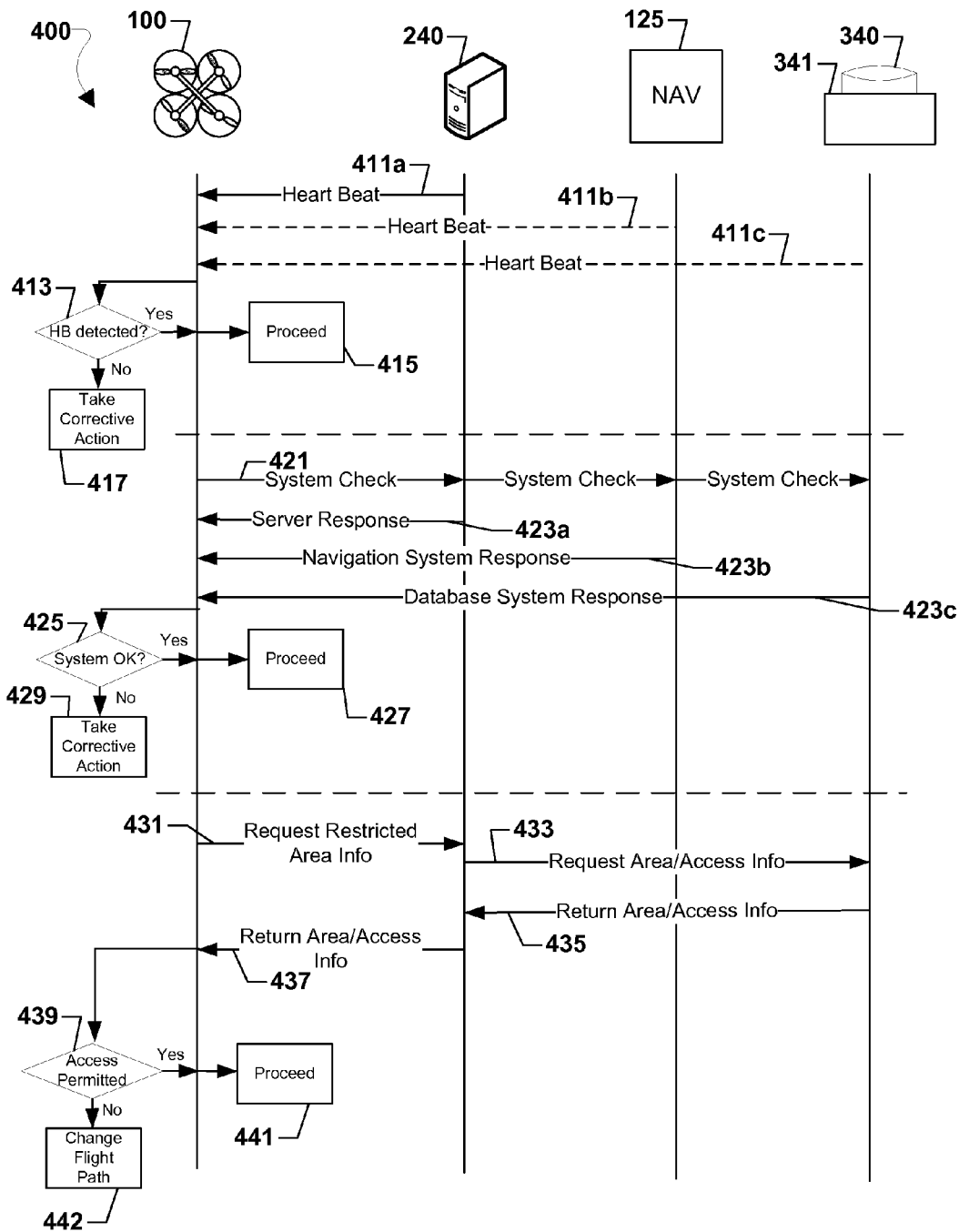
FIG. 4A-FIG. 4C are message flow diagrams illustrating messages exchanged between components of a drone access restriction system in the various embodiments.

FIG. 4A illustrates message flows between components of a conditional access system including a drone (e.g., 100, 100a, 100b, 371, 373, 375, 381, 383, 385, 387 in FIGS. 1-3D), a server (e.g., 240), a navigation unit (e.g., 125) of the drone, and a database (e.g., 341) of access restrictions stored on a data storage device (e.g., 340) according to various embodiments. With reference to FIGS. 1A-4A, before and/or during flight operations, the drone 100 may receive one or more respective heart beat signals 411a, 411b, 411c from components of the conditional access system, such as the server 240, the navigation unit 125, and/or the database 341/data storage device 340. The heart beat signals 411a-411c may confirm that these systems are functioning properly to enable the drone 100 to confirm that the guidance and information systems have not been compromised. The heart beat signals 411a -411c may be sent periodically during flight operations (e.g., at set time intervals, in response to a query from the server 240, or the like). The heart beat signals 411a-411c may be sent in a manner that prevents tampering or spoofing, such as a prearranged frequency schedule. The heart beat signals 411a-411c may be encoded to further prevent or discourage tampering or spoofing. Alternatively or additionally, the heart beat signals 411a -411c may be provided with identifying information of the respective sending system, such as a device identifier other identifier. The identifying information may also be encoded to prevent or discourage tampering or spoofing.

In determination block 413, for each of the critical systems that generate a heart beat signal, a processor of the drone 100 may determine whether the heart beat signal 411a-411c has been received. In response to determining that the heart beat signal has been received (i.e., determination block 413="Yes"), the processor of the drone 100 (such as the processor 120) may proceed with flight operations in block 415. In response to determining that a heart beat signal has not been received (i.e., determination block 413="No"), the processor of the drone 100 may take corrective actions in block 417. For example, the drone 100 may land, prevent takeoff, return to a drone base, attempt to re-establish communication with the system here restore the heart beat signal, or take another corrective action.

Alternatively or in addition to receiving the heart beat signals 411a -411c, the drone 100 may send a System Check signal 421 to the server 240, the navigation unit 125, and the database 341/data storage device 340. In response to the System Check signal 421, the server 240 may return a server response 423a, the navigation unit 125 may return a navigation system response 423b, and the database 341/data storage device 340 may return a database system response 423c. In determination block 425, for each system for which a system check signal 421 was sent, the processor of the drone 100 may determine whether a response 423a -423c was received. In response to receiving a response indicating that the respective system is functioning properly (i.e., determination block 425="Yes"), the processor of the drone 100 may proceed with flight operations in block 427. In response to determining either that a response was not received, or that a response was received indicating a malfunction (i.e., determination block 425="No"), the processor of the drone 100 may take an appropriate corrective action in block 429, such as land, return to base, or the like.

The type of response of action that is taken by the drone 100 may depend upon the system that is malfunctioning or not responding. For example, if the navigation unit 125 reports a system malfunction, the drone 100 may resort to a backup navigation method. As another example, if the server 240 reports a system malfunction or the processor of the drone 100 does not receive a response from the server 240, the drone 100 may loiter until communications with the server are reestablished. As a further example, the drone 100 may move to a safe location where an alternate access device may be available for the drone 100 to re-establish communications with the server 240. A further example, if the processor of the drone 100 does not receive a response from the database 341/data storage device 340 or receives an indication of a system malfunction, the drone 100 may forego conditional access to restricted areas and follow a flight path that flies around all restricted areas using previously obtained navigation information.

When the drone 100 is approaching a restricted area, or as part of a normal information acquisition procedure, the drone 100 may send a request 431 to the server 240 for information regarding the restricted area. The server 240 may send a request 433 to the database 341/data storage device 340 for the information for the restricted area or areas. The request 433 may be a message or may be a database query or data retrieval command. The database 341/data storage device 340 may return the information for the restricted area or areas in a response 435 to the server 240. The response 435 may be a message containing the information, or may be the information itself provided in response to the request 433. The server 240 may return the information for the restricted area in a message 437 to the drone 100. In various embodiments, the information regarding restricted areas may include geographic coordinates defining restricted area boundaries in a format that may enable the drone to plot a flight path around the restricted areas. In some embodiments, information regarding restricted areas may include altitude restrictions; conditional access restrictions, etc., such as the conditional restrictions (e.g., described with reference to FIG. 3A-3E).

In determination block 439, the processor of the drone 100 may determine whether access to the restricted area is permitted for the drone 100. In response to determining that access to the restricted area is not permitted (i.e., determination block 439="No"), the processor of the drone 100 may take corrective action, such as changing the flight path of the drone 100 in order to avoid the restricted area in block 442. For example, the drone may steer away from the restricted area or climb to a permitted altitude for over flight of the restricted area, or may proceed to an alternative destination, a drone base, or land in a safe area. Alternatively, the drone 100 may take further action to determine whether conditional access to the restricted area may be permitted, such as paying a toll or waiting for a time period when access to the restricted area will be permitted.

In response to determining that the access is permitted (i.e., determination block 439="Yes"), the processor of the drone 100 may fly the drone 100 through the restricted area in block 441.

Figure 4B:
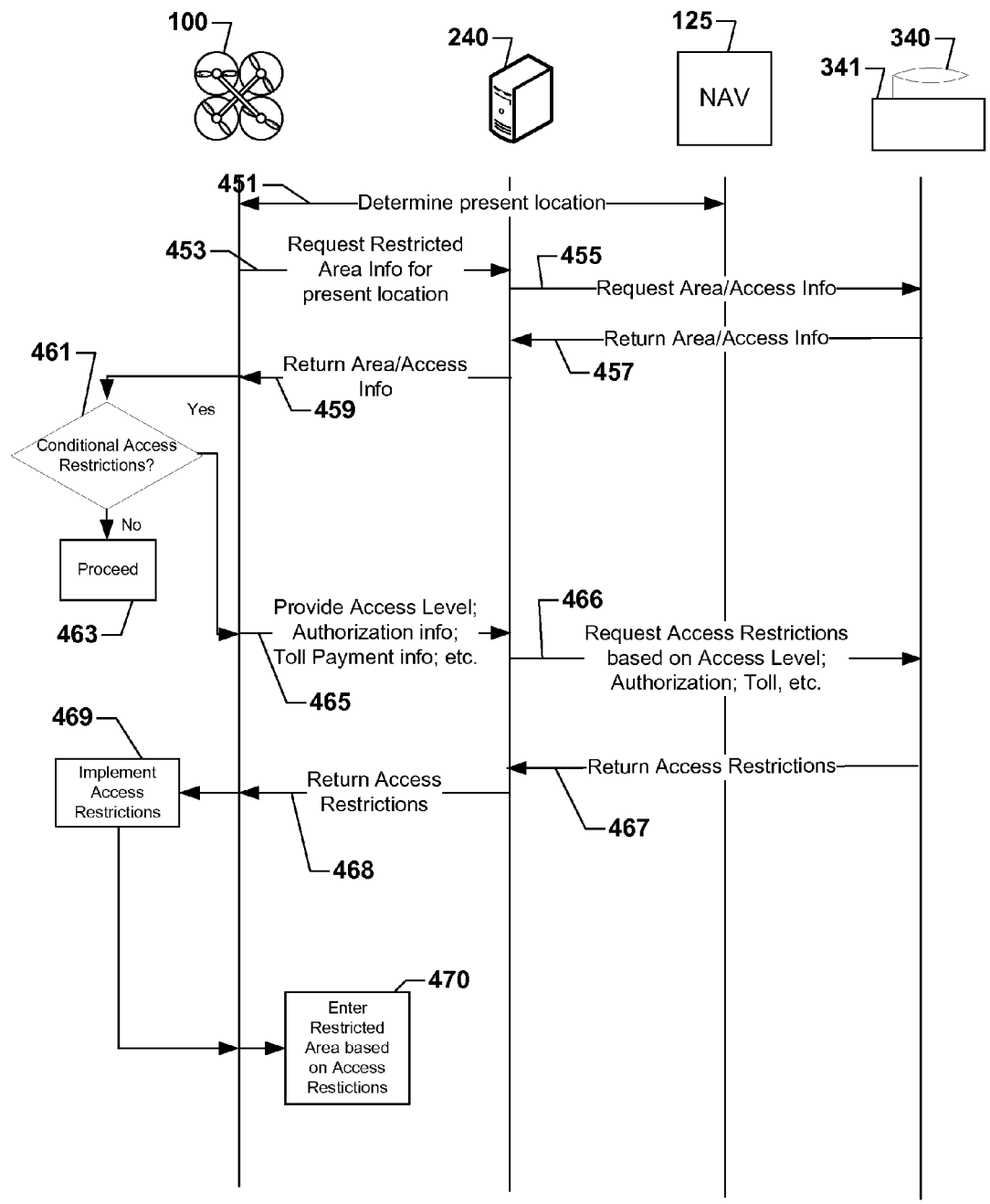

FIG. 4B illustrates message flows between components of a conditional access system including a drone (e.g., 100, 100a, 100b, 371, 373, 375, 381, 383, 385, 387 in FIGS. 1-4A), a server (e.g., 240), a navigation unit (e.g., 125) of the drone 100, and a database (e.g., 341) of access restrictions stored on a data storage device (e.g., 340) according to various embodiment in which the drone 100 may conditionally access a restricted area. With reference to FIGS. 1A-4B, the processor of the drone 100 (e.g., the processor 120) may communicate with the drone's navigation unit 125 to determine the present location of the drone 100. Based on present location information, the processor of the drone 100 may send a request 452 to the server 240 to obtain the access information for a nearby restricted area. The server 240 may send a request 455 to the database 341/data storage device 340 for the restricted access information. The database 341/data storage device 340 may send a response 457 to the request 455 by providing the restricted area access information to the server 240. The server 240 may send a message 459 to the drone 100 containing the restricted area access information. In determination block 461, the processor of the drone 100 may determine whether conditional access restrictions are provided in the restricted area access information received from the server 240. In response to determining that conditional access restrictions are not provided in the restricted area access information received from the server 240 (i.e., determination block 461="No"), the processor of the drone 100 may proceed with flight into the restricted area if other access restrictions are not present. In response to determining that conditional access restrictions are present in the restricted area access information received from the server 240 (i.e., determination block 461="Yes"), the processor of the drone 100 may provide information responsive to the conditions in a message 465 to the server 240. Such information include as the drone's access level, identity, authorization or authentication information, toll payment information, etc.

The server 240 may forward the information provided in the message 465 to the database 341/data storage device 340 in a message 466 that requests further restriction information. For example, based on the information provided in the message 466, the database 341/data storage device 340 may provide access restrictions such as time restrictions, use restriction, altitude restrictions in a reply message 467 to the server 240. The server 240 may pass the restrictions to the drone 100 in a message 468. The processor of the drone 100 may implement the access restrictions in block 469. If access is permitted under the conditions, the processor of the drone 100 may fly the drone 100 into the restricted area based on the access restrictions in block 470.

Figure 4C:
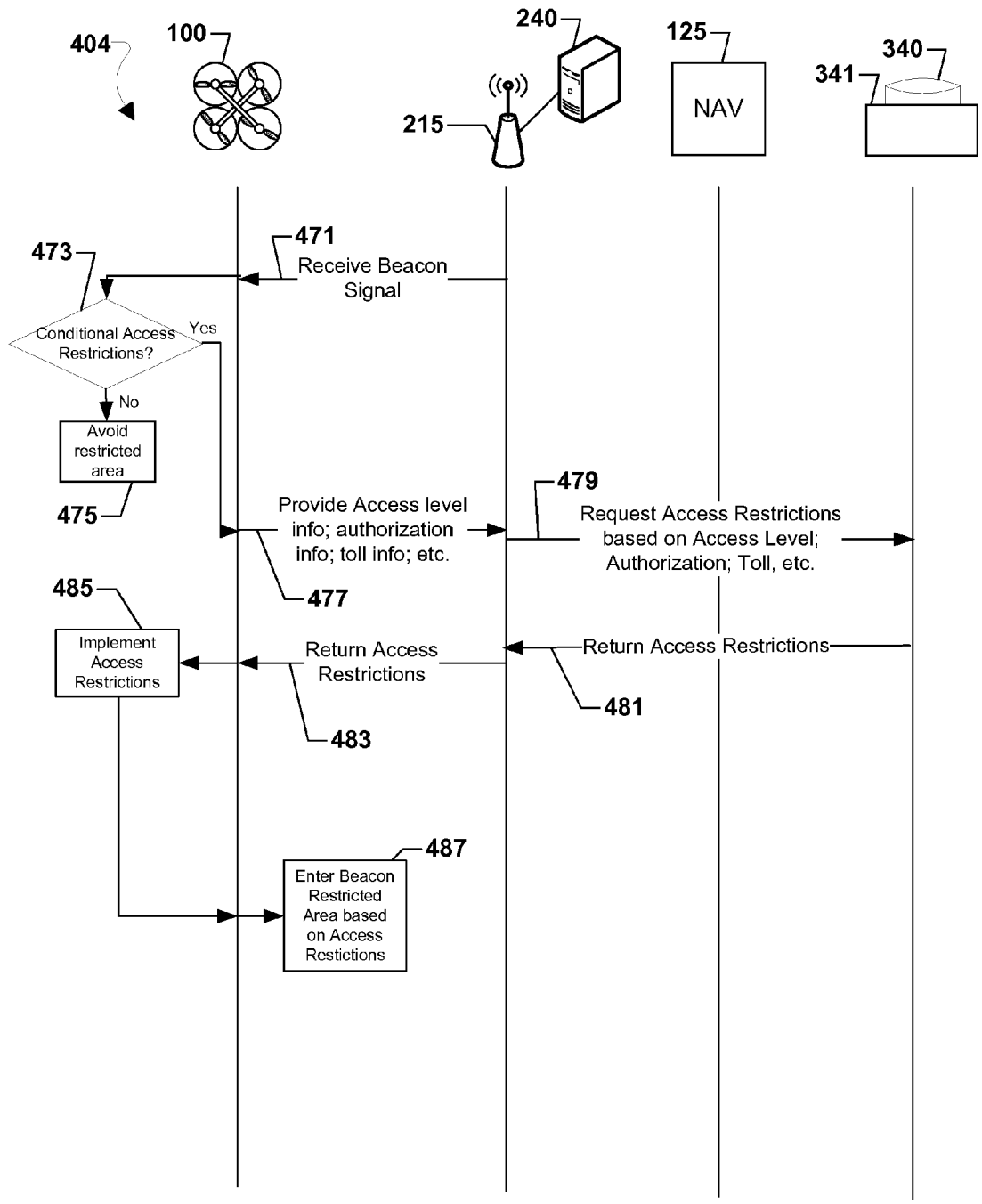

FIG. 4C illustrates message flows between components of a conditional access system including a drone (e.g., 100, 100a, 100b, 371, 373, 375, 381, 383, 385, 387 in FIGS. 1-4B), a server (e.g., 240) coupled to a beacon (e.g., 215), a navigation unit (e.g., 125) of the drone 100, and a database (e.g., 341) of access restrictions stored on a data storage device (e.g., 340) according to various embodiments in which the drone 100 may conditionally access a restricted area. With reference to FIGS. 1A-4C, a beacon signal 471 from the beacon 215 may be received and processed by the drone 100 processor (such as processor 120) and may contain information regarding the boundaries of the restricted area. In the illustrated embodiment, the beacon signal 471 may contain further information regarding conditional access restrictions to the restricted area.

In determination block 473, the processor of the drone 100 may determine whether the area associated with the beacon 215 may provide conditional access restrictions. For example, the area associated with the beacon 215 may allow access under certain conditions, such as allowing drones that belong to the owner of the area, allowing access during certain times, allowing access based on use restrictions, allowing access upon the payment of a toll, etc. In response to determining that the beacon signals 471 indicate that conditional access restrictions are not present (i.e., determination block 473="No"), the processor of the drone 100 may direct the drone 100 to avoid the restricted area associated with the beacon 215 in block 475. In response to determining that the beacon signals 471 indicate that conditional access restrictions are present (i.e., determination block 473="Yes"), the processor of the drone 100 may provide information in a message 477 to the beacon 215 (or directly to the server 240 or the like), such as drone access level, identity/authorization/authentication information, toll payment information, etc.

In some embodiments, the beacon 215 may be coupled to the server 240, or to a local server that separately maintains conditional access information for the restricted area or has access to the database 341/data storage device 340 and/or the server 240. A processor within the beacon 215 may send a request 479 to the database 341/data storage device 340 with the information provided in the message 477. The request 479 may be for conditional access restrictions based on the information for the drone 100. The database 341/data storage device 340 may return the conditional access restrictions in a message 481 to the beacon 215. The processor of the beacon 215 may provide the conditional access restrictions to the drone 100 in a message 483. The processor of the drone 100 may implement the conditional restrictions in block 485. The processor of the drone 100 may fly the drone 100 into the restricted area associated with the beacon 215 using the implemented conditional access restrictions in block 487.

Figure 5A:
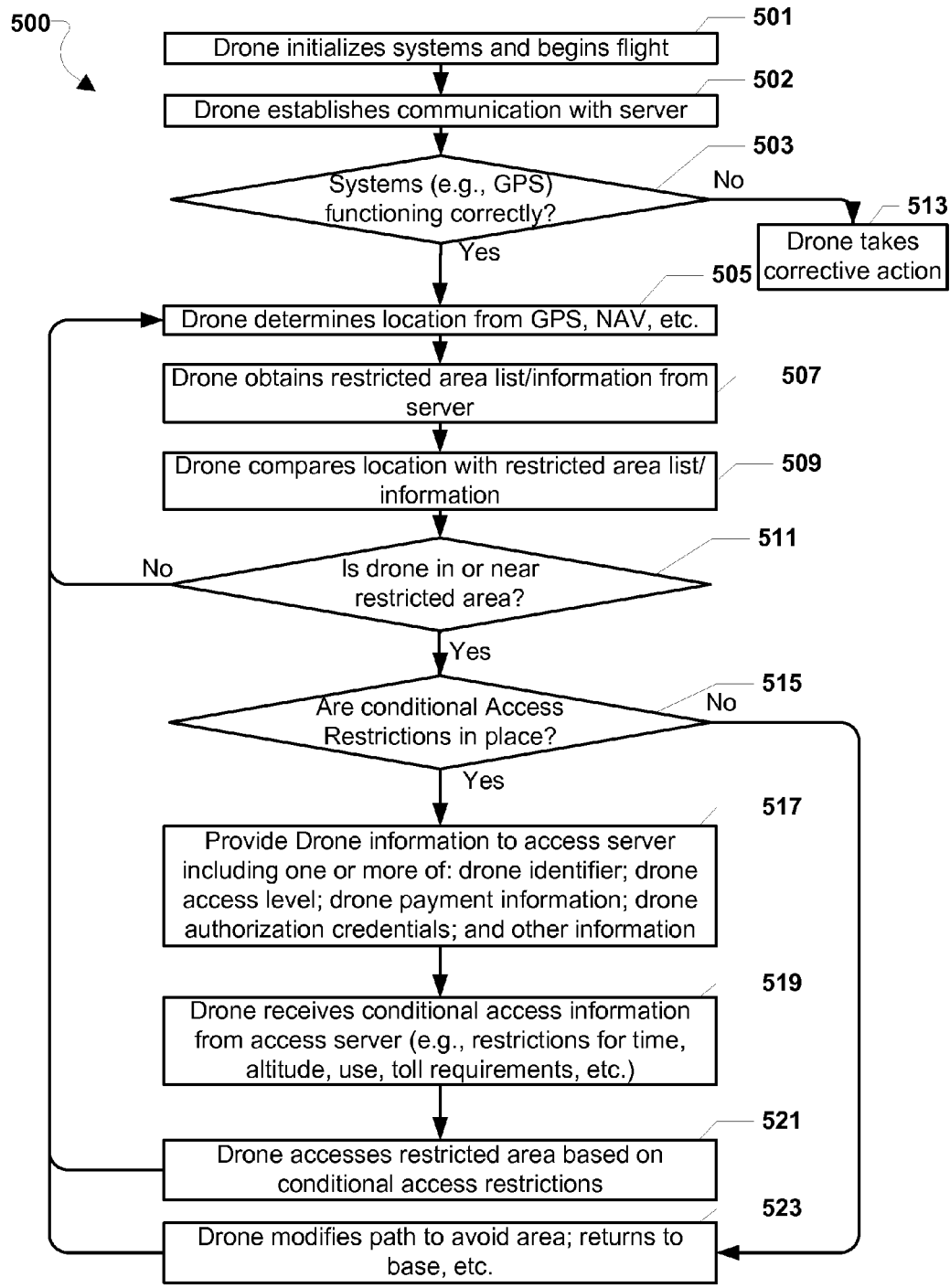
FIG. 5A is a process flow diagram illustrating a method for conditional access restriction for drones according to various embodiments.

FIG. 5A illustrates a method 500 of operations of a drone (e.g., 100, 100a, 100b, 371, 373, 375, 381, 383, 385, 387 in FIGS. 1-4C) for accessing restricted areas using restriction information obtained from a server (e.g., 240) according to various embodiments. With reference to FIGS. 1A-5A, to perform the operations of the method 500, the processor (such as the processor 120) of the drone 100 may initialize systems, such as navigation systems, in block 501. The processor of the drone 100 may establish wireless communication links with the server 240 in block 502.

In determination block 503, the processor of the drone 100 may determine whether the various systems are functioning properly. For example, the processor of the drone 100 may receive heart beat signals from a server, a navigation system, a database and/or data storage device, etc. Alternatively or additionally, the processor of the drone 100 may transmit system check messages to the various systems.

In response to determining that one or more of the systems are not functioning properly (i.e., determination block 503="No"), the processor of the drone 100 may direct the drone 100 to take corrective action. For example, the processor of the drone 100 may direct the drone 100 to land in a safe area, prevent takeoff, return to a drone base, etc. In the event that the processor determines that only some of the systems are not functioning, the processor of the drone 100 may take partial corrective action, such as relying on alternative navigation systems, alternative servers, or information sources, or may wait until systems regain functionality. In response to determining that the systems are functioning properly (i.e., determination block 503="Yes"), the processor of the drone 100 may determine the present location of the drone 100 in block 505, such as from navigation system 125.

In block 507, the processor of the drone 100 may obtain information associated with the location of restricted areas. For example, the processor of the drone 100 may receive a list of restricted areas in proximity to the location of the drone 100 obtained in block 505. In other embodiments, the processor of the drone 100 may be provided with a list of restricted areas and area information during initialization. In such embodiments, the information received in block 507 may represented updated information or additional information for restricted areas.

In block 509, the processor of the drone 100 may compare the location of the drone 100 to the location information of the restricted areas obtained in block 507. For example, the restricted area location information may include a point location for a restricted area, such as building. Alternatively or additionally, the restricted area location may include location boundaries for the restricted area, such as the boundary of a commercial airport or military base. The boundaries may include three-dimensional boundaries that include airspace above and around the restricted area. The processor of the drone 100 may determine its present location and determine whether the drone 100 is within one or more of the boundaries or is close to a boundary.

In determination block 511, the processor of the drone 100 may determine whether the drone 100 is within or near a restricted area based on the comparison in the block 509. In response to determining that the drone 100 is not in or near the restricted area (i.e., determination block 511="No"), the processor of the drone 100 may continue to determine the location of the drone 100 as flight operations proceed in block 505, obtain restricted area information in block 507, and make comparisons between the present location of the drone 100 and the restricted area information in block 509.

In response to determining that the drone 100 is in or near the restricted area (i.e., determination block 511="Yes"), the processor of the drone 100 may determine whether conditional access restrictions are in place in determination block 550. In response to determining that conditional access restrictions are not in place (i.e., determination block 515="No"), the processor of the drone 100 may direct the drone 100 to modify the present flight path to avoid the restricted area in block 523, and continues navigating along the modified flight path in block 505.

In response to determining that conditional access restrictions are in place (i.e., determination block 515="Yes"), the processor of the drone 100 may provide drone information to an access server 240 in block 517. For example, the processor of the drone 100 may provide a drone identifier, a drone access level, drone payment information, drone authorization credentials, and/or other information.

In block 519, the processor of the drone 100 may receive conditional access information from the access server 240, such as time period restrictions, use restrictions, toll restrictions, and so on. Alternatively, the conditional restriction information received from the access server 240 in block 517 may indicate that drone over flight access is unrestricted.

In block 521, the processor of the drone 100 may direct the drone 100 to enter airspace over the restricted area based on our response to the conditional restrictions receive in block 519. For example, if the drone identifier information indicates that the drone 100 belongs to the owner of the restricted area, the drone 100 may be granted unrestricted access to the restricted area. Further, the drone 100 may be provided conditional access that restricts operations, altitude, fly-over time, or requires payment of a toll, or a combination of such conditions in order to access the restricted area. During and after accessing the restricted area, the processor may continue to navigate along a flight path in block 505.

Figure 5B:
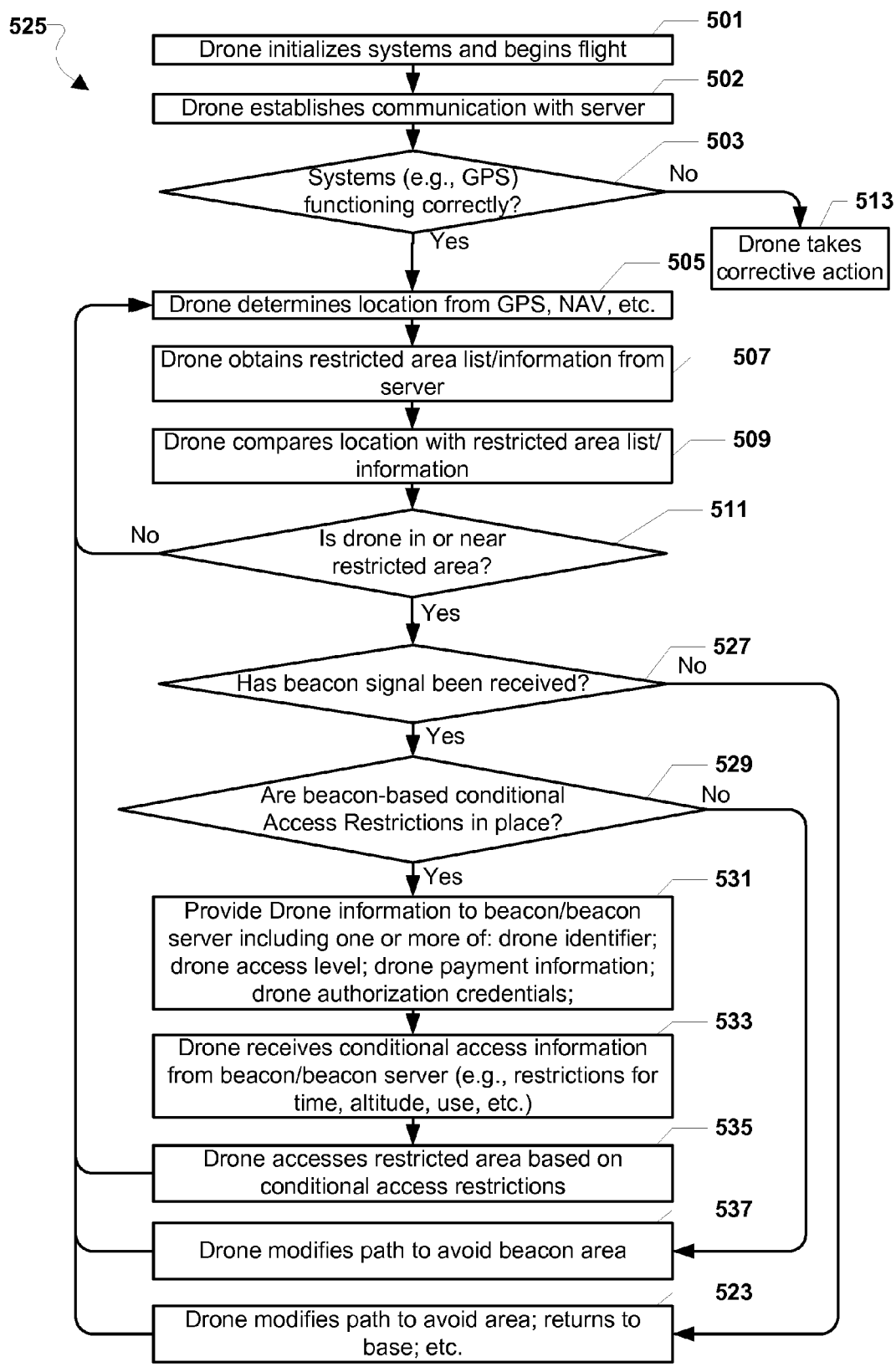
FIG. 5B is a process flow diagram further illustrating a method for conditional access restriction for drones according to various embodiments.

FIG. 5B illustrates a method 525 of operations of a drone (e.g., 100, 100a, 100b, 371, 373, 375, 381, 383, 385, 387 in FIGS. 1-4C) for accessing restricted areas using restriction information obtained from a wireless beacon according to various embodiments. With reference to FIGS. 1A-5B, a processor (e.g., processor 120) may perform the operations of blocks 501 through 511 as described with reference to the method 500. In response to determining that the drone 100 is not in or near a restricted area (i.e., determination block 511="No"), the processor of the drone 100 may continue determining the location of the drone 100 in block 505, and determining whether the drone is approaching a restricted area in blocks 507-511 as described.

In response to determining that the drone 100 is in or near a restricted area (i.e., determination block 511="Yes"), the processor of the drone 100 may determine whether a beacon signal has been received in determination block 527. In response to determining that a beacon signal has not been received (i.e., determination block 527="No"), the processor of the drone 100 may direct the drone 100 to modify the present flight path to avoid the restricted area in block 523 and continue navigating along the modified flight path in block 505.

In response to determining that a beacon signal has been received (i.e., determination block 527="Yes"), the processor may determine whether beacon-based conditional access restrictions are included in the received beacon signals in determination block 529. For example, the beacon signals provided by a beacon device (e.g., beacon 215) may "advertise" or otherwise communicate the presence of conditional access restrictions. In some embodiments, information about restricted areas designated or controlled by beacons may be provided to the processor of the drone from a server (e.g., server 240) accessible to the drone before or upon reaching the restricted area.

In response to determining that beacon-based conditional access restrictions are not present in the received beacon signals (i.e., determination block 529="No"), the processor of the drone 100 may direct the drone 100 to modify its flight path to avoid the restricted area in block 537 and continue navigating along the modified flight path in block 505.

In response to determining that beacon-based conditional access restrictions are present in the received beacon signals (i.e., determination block 529="Yes"), the processor of the drone 100 may transmit drone information to the beacon device in block 531. For example, the processor of the drone 100 may transmit a drone identifier, a drone access level, drone payment information, drone authorization credentials, and/or other information.

In block 533, the processor of the drone may receive conditional access information from the beacon device and/or a beacon server, such as time period restrictions, use restrictions, toll restrictions, and so on. Alternatively, the conditional restriction information transmitted in received beacon signals may indicate that access to the restricted area is unrestricted based on information transmitted by the drone to the beacon device in block 531.

In block 535, the processor of the drone 100 may direct the drone 100 to access the beacon controlled restricted area responsive to or based on the conditional restrictions receive in block 533. For example, if the drone identifier information indicates that the drone 100 belongs to the owner of the beacon controlled restricted area, the drone 100 may be allowed unrestricted access to the restricted area. Further, the drone 100 may be provided conditional access that restricts use, altitude, or requires a toll, or a combination of conditional restrictions as a condition of accessing the restricted area as described herein. During or after accessing the restricted area, the processor may continue navigating along a flight path in block 505.

Figure 6A:
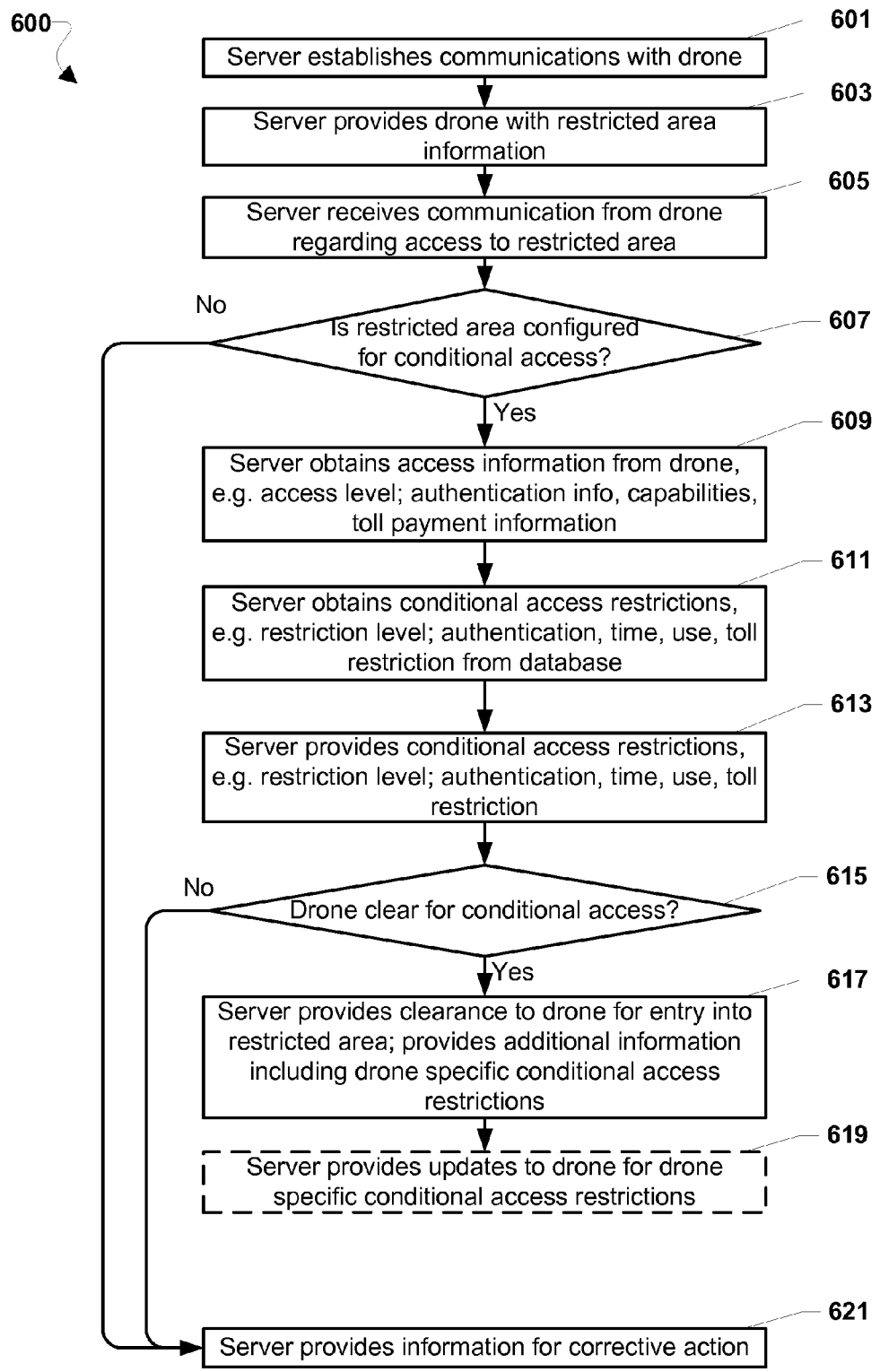
FIG. 6A is a process flow diagram illustrating a method of a server processor providing conditional access to a restricted area by drone according to various embodiments.

FIG. 6A illustrates a method 600 that may be implemented in a server (e.g., server 240 in FIGS. 2A-2C, 3C-4C) for providing a drone (e.g., drone 100, 100*a*, 100*b*, 371, 373, 375, 381, 383, 385, 387 in FIGS. 1-4C) conditional access to restricted areas according to some embodiments. With reference to FIGS. 1A-6A, in block 601, the server may establish communications with the drone. For example, the server may connect to the drone through an RF module on the drone that is configured to support multiple communication connections, such as WiFi, local area network (LAN), or other short range communication, cellular or Wide Area Network (WAN) connection, or possibly a wired connection when the drone is coupled to a base station, charging station or other stationary communication station. The drone may support network connections and communications using Internet Protocol (IP) or similar network protocol. The server may establish a connection with the drone through a series of intermediate nodes. The server may accept an Internet based connection from the drone.

In block 603, the server may provide the drone with restricted area information. In some embodiments, the server may be a local server. That is, the server may be local to the restricted area that the drone is attempting to enter. For example, the local server may be associated with a beacon (e.g., 215). In other embodiments, the server may be a server operated by the drone operator. In such an example, the server may provide the information to the drone before the drone embarks on a flight, or may provide the information while in flight. In other embodiments, the server may be operated by the drone operator, and may provide the information to the drone through a local server, or a local access point, with which the drone has established communication.

In block 605, the server may receive communications from the drone regarding access to a restricted area. For example, when the drone is in proximity to a restricted area, the drone may request information regarding access, such as whether conditional access is available for the restricted area. Such request may be received by the server.

In determination block 607, the server may determine whether the restricted area is configured for conditional access. For example, the server may consult a database that indicates the status of various restricted areas regarding conditional access. The database may be maintained by the server. Alternatively or additionally, the database may be accessible to various devices, such as authenticated devices including devices associated with restricted areas or operators of restricted areas, which may update the conditional access status periodically. In addition, as will be described in greater detail the database may contain the restrictions themselves.

In response to determining that the restricted area is not configured for conditional access (i.e., determination block 607="No"), the server may provide information for corrective action to the drone in block 621. For example, the server may provide a location at which the drone may land for recovery. Alternatively, the server may provide instructions on how to proceed, such as an alternative route, alternative destination, return destination, return command to a destination known to the drone, and so on. For example, the server may provide information regarding a route or flight path, including any relevant altitude restrictions, for the drone to avoid the restricted area.

In response to determining that the restricted area is configured for conditional access (i.e., determination block 607="Yes"), the server may obtain access information from the drone in block 609. For example, the server may query the drone for information such as the access level, authentication information, capabilities (e.g., data collection, etc.), toll payment information, and so on. In embodiments whether the server is operated by the drone operator, the information may already be available to the server and a query or prompt may not be required. In other embodiments, the drone may provide information when the drone requests information regarding conditional access, such as in block 605.

In block 611, the server may obtain conditional access information from a database. For example, the server may consult a database of conditional access restrictions for the restricted area. The database may be local to the server. Alternatively or additionally, the database may be accessible to the server through a network. For example, the server may make contact with a server associated with the restricted area to obtain information regarding conditional access. In some embodiments, the server may have access to one database that provides at least partial information regarding conditional access and may obtain updated conditional access information from another database, such as the database associated with the restricted area.

In block 613, the server may provide the conditional access restriction information to the drone based on the drone information obtained in block 609 (or 605). For example, the server may obtain the access level for the drone and consult the database to determine the conditional access requirements based on the drone access level. The server may further process toll payment information in the event a toll is required for conditional access. The server may determine the relevant Time Period and may grant or deny access, or provide conditional access that is appropriate for the relevant Time Period. The server may provide use restrictions for the drone based on the capabilities of the drone and the conditional access restrictions (e.g., no data collection, minimum altitude, etc.). The server may either process or forward authentication credentials collected from the drone for processing. The server, or the processor of a local server associated with the restricted area may conduct authentication processing to allow or deny access by the drone to the restricted area based on the authentication processing.

In determination block 615, the server may determine whether the drone is clear for conditional access. For example, the server may conduct authentication processing, which results in successful authentication. The server may determine that, based on the access level of the drone and the access restrictions of the restricted area, the time period, and/or other conditions that access by the drone is permitted, subject to the conditions. In some embodiments where the server is operated by the drone operator in a location other than the restricted area location, the server may receive information from a different server that is local to the restricted area clearing the drone for entry into the restricted area, subject to the conditions.

In response to determining that the drone is not clear for conditional access (i.e., determination block 615="No"), the server may provide information for corrective action to the drone in block 621. For example, the server may provide a location at which the drone may land for recovery. Alternatively, the server may provide instructions on how to proceed, such as an alternative route, alternative destination, return destination, return command to a destination known to the drone, and so on. For example, the server may provide information regarding a route or flight path, including any relevant altitude restrictions, for the drone to avoid the restricted area.

In response to determining that the drone is clear for conditional access (i.e., determination block 615="Yes"), the server may provide clearance to the drone for entry or access into the restricted area in block 617. For example, the server may provide a flight path through the restricted area that takes into account the conditional access restrictions and may instruct the drone regarding use restrictions, such as restrictions on data collection. Alternatively or additionally, the processor of the drone may provide a clear indication and the drone may proceed to enter the restricted area and may enforce conditional restrictions independently.

In optional block 619, the server may provide periodic updates to conditional access restrictions. For example, during the flight of the drone within the restricted area, a time period may transition from a Time Period A to a Time Period B. The server may provide updated conditional access restrictions, which may include an increase or a decrease in the level of restriction. For example, while data collection may have been restricted during Time Period A, data collection may be permitted during Time Period B. Further, while the altitude minimum restriction for the drone may have been 100 feet during Time Period A, the altitude minimum for the drone may be raised (e.g., more restrictive) to 300 feet during Time Period B.

It may be understood that the level of restriction (e.g. more restrictive or less restrictive) may depend entirely on the nature of the restricted area, the time, and other factors or conditions. For example, in some restricted areas during a particular time, an increase in an altitude minimum may represent a more restrictive condition, such as where critical operations for the area occur at ground level or at low altitudes. In other examples, during a given time, an increase in an altitude minimum may represent a less restrictive condition, such as where critical operations for the area occur at a higher altitude allowing the drone to operate at those altitudes, although not necessarily during the critical operations.

Figure 6B:
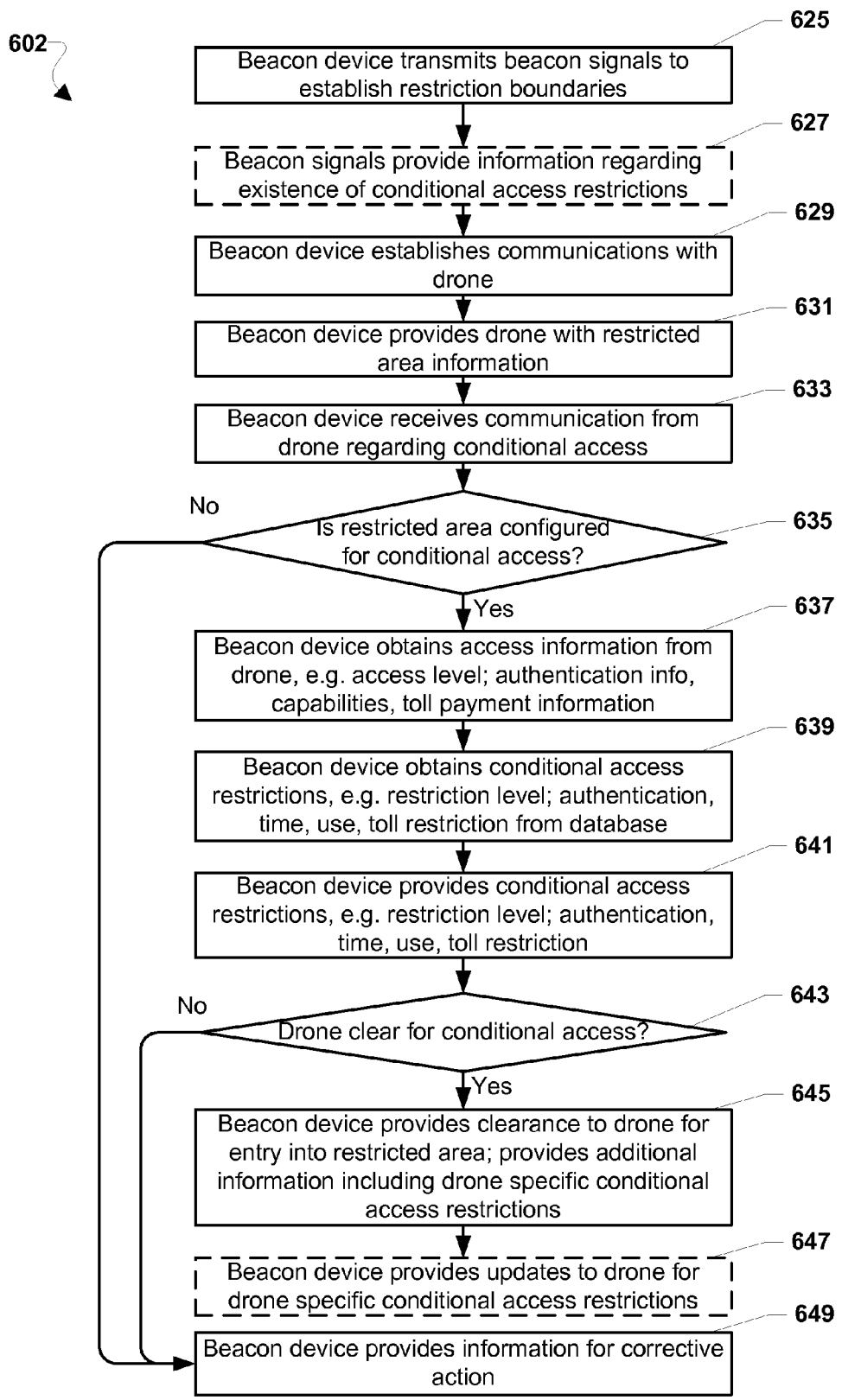
FIG. 6B is a process flow diagram illustrating a method of a processor of a beacon device providing conditional access to a restricted area by drone according to various embodiments.

FIG. 6B illustrates a method 602 that may be implemented in a processor of a beacon device (e.g., beacon 215 in FIGS. 3A-3E and 4C) for providing a drone (e.g., drone 100, 100a, 100b, 371, 373, 375, 381, 383, 385, 387 in FIGS. 1-4C) conditional access to restricted areas according to various embodiments. With reference to FIGS. 1A-6B, in block 625, the processor of the beacon device may control a radio transmitter or transceiver to transmit signals that may be used to establish boundaries for a restricted with which the beacon device is associated. As described, the reception range of the beacon signals may be used to establish the boundaries of the restricted area. However, the range of the beacon signals may not be subject to precise control at all times. Further, because the beacon signals may be emitted in a generally radial fashion from the transmitted, using beacon signals alone to establish restricted are boundaries may be ineffective at establishing irregular boundaries for an irregularly shaped restricted area. Thus, in some embodiments, the processor of the beacon device may control the transmission of the beacon signals to provide information regarding the boundaries of the restricted area. In such embodiments, the range of the beacon signals may extend beyond the actual boundaries. Alternatively or additionally, a plurality of beacon devices may be present within a restricted area such that coverage may be provided for all portions of a restricted area, including irregularly shaped portions.

In alternative or optional block 627, the processor of the beacon device may configure the transmission of the beacon signals to provide information regarding the existence of conditional access restrictions. For example, in the event that the restricted area does not prohibit all drone flight, the processor of the drone device may indicate that conditional access is available. The indication may be provided by the processor of the beacon device in the beacon signals, or the indication may be provided through other communications, such as with a server of the drone operator or a server responsible for maintaining information about restricted areas including conditional access restrictions.

In block 629, the processor of the beacon device may establish communication with the drone. For example, the beacon signals may, in addition to providing boundary information for the restricted area, may enable the processor of the beacon device to communicate with the drone. The processor of the beacon device may also be in communication with a local server and/or with a local area network for the restricted area. The processor of the beacon device may also have the ability to connect to the Internet. The processor of the beacon device may provide a connection to the Internet to a drone.

In block 629, after communication is established with the drone, the processor of the beacon device may provide information to the drone about the restricted area, such as boundaries, altitudes, and other information about the restricted area. The information provided by the processor of the beacon device in block 629 may be in addition to or in lieu of the information provided in optional block 627. It may be understood that, in optional block 627, information may be provided by the processor of the beacon device in the beacon signals without the need to establish communications with the drone. In other words, by receiving the beacon signals transmitted from the beacon device, the drone may obtain certain information from the processor of the beacon device without engaging in a communication session. In contrast, in block 629, a communication session may be established between the processor of the beacon device and the drone such that the processor of the beacon device may provide additional information about the restricted area.

In block 633, the processor of the beacon device may receive communication from the drone, such as requesting whether the restricted area is subject to conditional access. For example, the processor of the beacon device may receive a request for an indication regarding the availability of conditional access. In some embodiments, the drone may provide some information with the request, such as the access level for the drone, the identifier of the drone (indicating ownership), and/or other information.

In determination block 635, the processor of the beacon device may determine whether conditional access is available. For example, the processor of the beacon device may obtain information in block 633 indicating the access level, identifier of the drone, and/or other drone information. In the event the drone identifier indicates the drone belongs to the owner of the property where the beacon device is placed, the processor of the beacon device may grant immediate access to the drone. In some embodiments, if the drone does not belong to the owner, the processor of the beacon device may deny access under any conditions or may provide an indication that conditional access is possible as further described herein. In further embodiments, the beacon device may be of limited "intelligence" or at least may have limited access to information regarding the conditional access restrictions for the restricted area. In such embodiments, the processor of the beacon device may communicate with a local or remote server to determine whether conditional access is available.

In response to determining that the restricted area is configured for conditional access (i.e., determination block 635="No"), the processor of the beacon device may provide information for corrective action to the drone in block 649. For example, the processor of the beacon device may provide a location at which the drone may land for recovery. Alternatively, the processor of the beacon device may provide instructions on how to proceed, such as along an alternative route, to an alternative destination, to a return destination, to return a command to a destination known to the drone, and so on. For example, the processor of the beacon device may provide information regarding a route or flight path, including any relevant altitude restrictions, for the drone to avoid the restricted area.

In response to determining that the restricted area is configured for conditional access (i.e., determination block 635="Yes"), the processor of the beacon device may obtain access information from the drone in block 637. For example, the processor of the beacon device may query the drone for information such as the access level, authentication information, capabilities (e.g., data collection, etc.), toll payment information, and so on. In embodiments in which the beacon device is operated by the drone operator, the information may already be available to the processor of the beacon device and a query or prompt may not be required. In some embodiments, the drone may provide information when the drone requests information regarding conditional access, such as in block 633.

In block 639, the processor of the beacon device may obtain conditional access information from a database. For example, the processor of the beacon device may consult a database of conditional access restrictions for the restricted area. The database may be local to the beacon device, such as in connection with a server that is also local to the beacon device. Alternatively or additionally, the database may be accessible to the beacon device through a network. For example, the processor of the beacon device may make contact with a server associated with the restricted area to obtain information regarding conditional access. In some embodiments, the server may have access to one database that provides at least partial information regarding conditional access and may obtain updated conditional access information from another database, such as the database associated with the restricted area.

In block 641, the processor of the beacon device may provide the conditional access restriction information to the drone based on the drone information obtained in block 637 (or 633). For example, the processor of the beacon device may obtain the access level for the drone and consult the database to determine the conditional access requirements based on the drone access level. The processor of the beacon device may further process toll payment information in the event a toll is required for conditional access. The processor of the beacon device may determine the relevant Time Period and may grant or deny access, or provide conditional access that is appropriate for the relevant Time Period. The processor of the beacon device may provide use restrictions for the drone based on the capabilities of the drone and the conditional access restrictions (e.g., no data collection, minimum altitude, etc.). The processor of the beacon device may either process or forward authentication credentials collected from the drone for processing. The processor of the beacon device, or the processor of a local server associated with the restricted area may conduct authentication processing to allow or deny access by the drone to the restricted area based on the authentication processing.

In determination block 643, the processor of the beacon device may determine whether the drone is clear for conditional access. For example, the processor of the beacon device may conduct authentication processing, which results in successful authentication. The processor of the beacon device may determine that, based on the access level of the drone and the access restrictions of the restricted area, the time period, and/or other conditions that access by the drone is permitted, subject to the conditions. In some embodiments, the beacon device may be self-sufficient and may determine whether the drone is clear for landing. For example, the beacon device may have an independent database that maintains information for conditional access. In other embodiments, a server coupled to the beacon device may be in a location other than the restricted area location. In such cases, the processor of the beacon device may receive information from the remote server or may receive information from a server that is local to the restricted area clearing the drone for entry into the restricted area, subject to the conditions.

In response to determining that the drone is not clear for conditional access (i.e., determination block 643="No"), the processor of the beacon device may provide information for corrective action to the drone in block 649. For example, the processor of the beacon device may provide a location at which the drone may land for recovery or to wait for possibly access at a later time. Alternatively, the processor of the beacon device may provide instructions on how to proceed, such as an alternative route, alternative destination, return destination, return command to a destination known to the drone, and so on. For example, the processor of the beacon device may provide information regarding a route or flight path, including any relevant altitude restrictions, for the drone to avoid the restricted area. In some embodiments, a network connection available to the drone through the beacon device may allow the drone to communicate with a "friendly" server (e.g. a server that is not associated with the beacon device in order to obtain information regarding corrective action).

In response to determining that the drone is clear for conditional access (i.e., determination block 643="Yes"), the processor of the beacon device may provide clearance to the drone for entry or access into the restricted area in block 645. For example, the processor of the beacon device may provide a flight path through the restricted area that takes into account the conditional access restrictions and may instruct the drone regarding use restrictions, such as restrictions on data collection. Alternatively or additionally, the processor of the beacon device may provide a clear indication and the drone may proceed to enter the restricted area and may enforce conditional restrictions independently. In such embodiments, drone movement may be monitored by the beacon device or other devices within the restricted are to ensure compliance.

In optional block 647, the processor of the beacon device may provide periodic updates to conditional access restrictions. For example, during the flight of the drone within the restricted area, a time period may transition from a Time Period A to a Time Period B. The processor of the beacon device may provide updated conditional access restrictions, which may include an increase or a decrease in the level of restriction. For example, while data collection may have been restricted during Time Period A, data collection may be permitted during Time Period B. Further, while the altitude minimum restriction for the drone may have been 100 feet during Time Period A, the altitude minimum restriction for the drone may be raised (e.g., more restrictive) to 300 feet during Time Period B.

It may be understood that the level of restriction (e.g. more restrictive or less restrictive) may depend entirely on the nature of the restricted area, the time, and other factors or conditions. For example, in some restricted areas during a particular time, an increase in an altitude minimum may represent a more restrictive condition, such as where critical operations for the area occur at ground level or at low altitudes. In other examples, during a given time, an increase in an altitude minimum may represent a less restrictive condition, such as where critical operations for the area occur at a higher altitude allowing the drone to operate at those altitudes, although not necessarily during the critical operations. In some embodiments, the drone may be required to leave the restricted area all together.

Figure 6C:
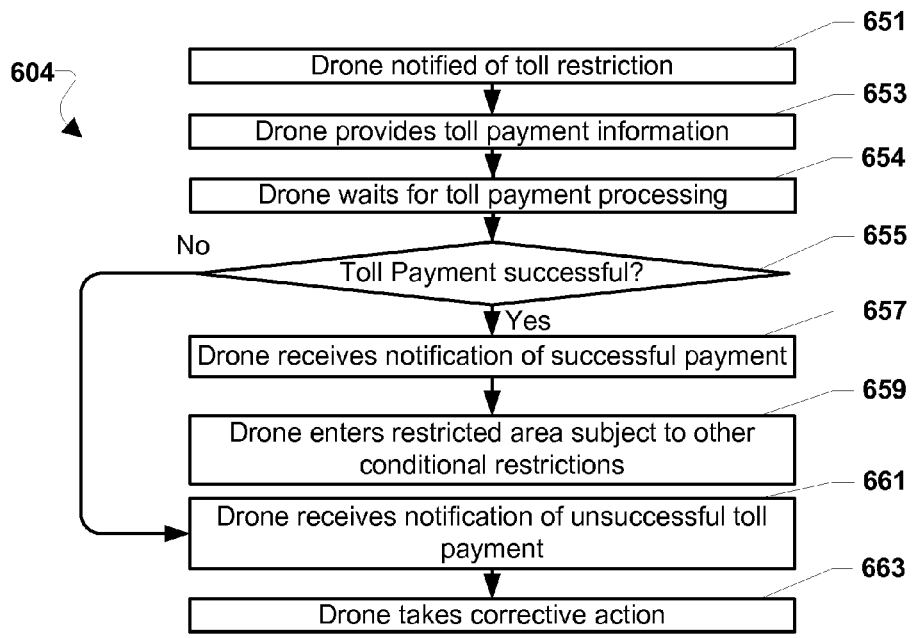
FIG. 6C-FIG. 6D are process flow diagrams illustrating embodiment methods of providing conditional access based on toll collection.

FIG. 6C illustrates a method 604 that may be implemented in a processor of a drone (e.g., drone 100, 100*a*, 100*b*, 371, 373, 375, 381, 383, 385, 387 in FIGS. 1-4C) to obtain conditional access to restricted areas by paying a toll according to some embodiments. With reference to FIGS. 1A-6C, in block 651, the processor (e.g., processor 120) of the drone may be notified or otherwise become aware of toll restrictions associated with a given restricted area. In some embodiments, the toll payment information may be provided with other information for conditional access. In other embodiments, the toll payment information may be the only restriction on access or may be provided and processed apart from additional conditional access restrictions. For example, in some embodiments, the processor of the drone may encounter a toll sensor indicating that a toll is required for access to the restricted area. The toll sensor may be a structure such as a mast or pole or other structure having a communication device installed in a location that is adjacent to a drone byway. Alternatively, a restricted area may be provided with a series of toll sensing devices that can detect when a drone is present in or near the restricted area. Thus, the processor of the drone may be notified of a toll restriction by a communication from one or more toll sensors located near the restricted area.

In block 653, the drone may provide toll payment information. For example, the processor of the drone may provide one or more of an identifier, account information, authentication credentials, and/or other information that may be necessary to complete a toll payment. In embodiments where the drone operator has a pre-existing account, the processor of the drone may provide information sufficient to associate the drone with the pre-existing account. In other embodiments, the processor of the drone may provide information associated with a one-time payment account (e.g., credit card), which may be charged for entry into the restricted area. Other payment methods are possible.

In block 654, the processor of the drone may wait for a processing element to process the toll payment transaction. For example, the processor of the drone may wait to receive an indication or notification that the payment has been processed or denied for performing further action. Alternatively, the processor of the drone may fly the drone into enter the area on the assumption that the payment will be successfully processed. In the event that the payment is not successfully processed, the drone may take further action as described.

In determination block 655, the processor of the drone may determine whether payment has been successfully processed. In response to determining that the toll payment has not been successfully processed (i.e., determination block 655="No"), the processor of the drone may receive a notification that the toll payment was unsuccessful in block 661. In block 663, the processor of the drone may direct the drone to take corrective action as previously described herein, such as in connection with block 513.

In response to determining that the toll payment has been successfully processed (i.e., determination block 655="Yes"), the processor of the drone may receive a notification or confirmation of the successful payment processing in block 657. For example, the processor of the drone may receive transaction information and information or an indication that allows the drone to proceed.

In block 659, the processor of the drone may enter the restricted area subject to other conditional access restrictions that may be provided. In some embodiments, when the toll payment has been successfully processed, the processor of the drone will receive additional conditional access restrictions through operations as previously described.

Figure 6D:
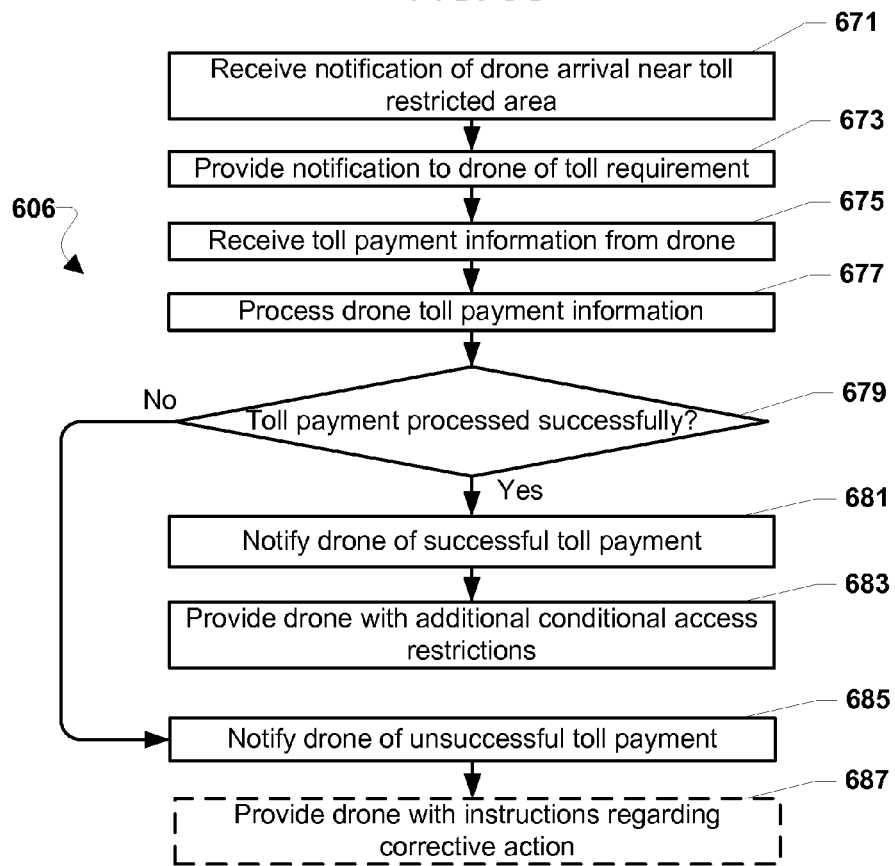

In method 606, which is illustrated in FIG. 6D, a processor of a server and/or a processor of beacon, ("restricted area processor") may conduct operations associated with toll payment. With reference to FIGS. 1-6D, in block 671, the restricted area processor of a toll restricted area may be notified or otherwise become aware of the arrival or presence of a drone within or near the airspace of the restricted area. For example, input received from one or more toll sensors may indicate to the restricted area processor that a drone is attempting to gain access to the restricted area.

In block 673, the restricted area processor may provide a notification to the drone that a toll is required for access. Other conditional access requirements may be imposed by the restricted are processor and may be provided to the drone. For example, the restricted area processor may establish communication with the drone and may provide the toll information in a message transmitted to the drone. In a beacon device embodiment, the toll information may be transmitted in a beacon signal or in a communication established between the drone and the beacon device.

In block 675, the restricted area processor may receive the toll payment information from the drone. For example, the restricted area processor may receive one or more of an identifier, account information, authentication credentials, and/or other information that may be necessary to complete a toll payment as described with reference to block 653.

In block 677, the restricted area processor may process the toll payment based on the toll payment information provided in block 675. For example, the drone operator may have a pre-existing account with the operator of the restricted area. The information provided by the drone may be sufficient to allow the restricted area processor to associate the drone with the pre-existing account. In other embodiments, the drone may provide information associated with a one-time payment account (e.g., credit card). The restricted area processor may charge the payment account for entry into the restricted area such as through a payment server or payment transaction system. In other embodiments, the sensor devices may be set up to receive and process the toll payment information at least partially. The restricted area processor may complete or facilitate toll charging operations of the sensors. Other payment methods are possible.

In determination block 679, the restricted area processor may determine whether the toll payment was successfully processed. For example, the restricted area processor may confirm that the toll payment was successfully processed or was unsuccessful. The restricted area processor may receive a confirmation from a payment system to which the restricted area processor is coupled, the confirmation may indicate the status of the payment, whether successful or unsuccessful. Alternatively, the restricted area processor may be configured to process the toll payment directly and may receive a confirmation from a toll payment module that the transaction was successfully completed or was unsuccessful.

In response to determining that the toll payment was not processed successfully (i.e., determination block 679="No") the restricted area processor may notify the drone that the payment was unsuccessful in block 685. The restricted area processor may deny entry by the drone into the restricted area. As an optional operation in block 687, the restricted area processor may provide instructions to the drone for taking corrective action.

In response to determining that the toll payment was not processed successfully (i.e., determination block 679="Yes") the restricted area processor may notify the drone that the payment was successful in block 681. The restricted area processor may provide a confirmation to the drone or other communication that indicates that the payment was successful. In block 683, the restricted area processor may provide additional conditional restrictions as described previously herein.

As described, conditional access information regarding restricted areas may be maintained and provided to a drone processor in a list that may be stored in memory. In some embodiments, the list may be a "blacklist" that includes coordinates of boundaries of the restricted areas that drones may not access or access subject to access conditions. In some embodiments, the list may be a "whitelist" that includes coordinates of allowed travel corroders and areas over which drones are permitted to operate freely. Restricted areas may be those areas not included within permitted airspace boundaries. In some embodiments, conditional access information and restricted areas may be identified in combinations of blacklists and whitelists that may be stored in a drone's memory as a database 341.

In general, a blacklist may include boundary coordinates and conditional access information for areas determined by one or more entities to be restricted for some or all usage by drones. In various embodiments, one or more blacklists may be maintained by operators, third parties, federal/government agencies (e.g., FAA), etc. Blacklists may include areas that have been determined to be less than desirable for drone operation. Reasons for desirability or lack of desirability for drone operation may include drone observations, temporary or persistent weather systems (e.g., based on RADAR or weather information (e.g., NOAA)), and so on. Some areas may be black listed in return for a payment by the owner to an authority to have the area black listed.

In various embodiments, more than one blacklist may be provide to or stored in the drone. Alternatively or additionally, blacklists may be provisioned at multiple locations. For example, a first restricted-area list (e.g., a blacklist) with 1000 restricted areas may be provisioned on or received from a first server (e.g., maintained by a government agency), and a second restricted-area list (e.g., blacklist) with 2000 restricted areas, which may or may not overlap with the first list, may be provisioned on or received from a second server. As described, the information regarding the restricted areas may also or alternatively be maintained and provided as a "whitelist" that identify to areas over which drone flight is allowed (e.g., excludes restricted areas from allowed travel).

In various embodiments, the contents of a blacklist or a whitelist may change over time. For example, the black list may change based on various parameters, such as time of day, day of week, date, etc. Areas may be removed from blacklists once a restricted area is no longer restricted. In further examples, a drone may be prevented from flying over a sports venue or other venue when a game (or event) is scheduled or otherwise in progress, but allowed to fly over the venue when no event is scheduled or in progress. The blacklist conditional access information may limit drone flight to certain heights (e.g., at or above 3000 feet), and/or certain air space corridors above/below a restricted area, where drone flight is not restricted. The blacklist information may be on an ad hoc basis. For example, during an emergency situation, drone flight access to an area may be temporarily restricted to authorized drones (e.g., drones operated by police or fire departments). Alternatively, during an emergency, drone flight access may be temporarily allowed subject to conditions, such as subject to sharing video data with authorities.

In various embodiments, blacklist information for certain areas may be updated based on drone observations, including observations by other drones, or third-party entities. When observations are made, the data may be relayed to a server of an authority, individual, or entity responsible for a blacklist. Based on information in the observations, the server may update the blacklist to include conditional access criteria or updated restriction boundaries for certain areas.

The updated blacklist may be provided to a server for provisioning to other drones. In some embodiments, the information provided in updates to blacklist contents, such as observation related updates, may decay or expire over time. In such embodiments, information may be provided with an expiration time. Non-exhaustive and non-limiting examples of observations may include observations from drones that encounter beacon signals that restrict access to an area associated with beacon signals that was not previously on the blacklist. A drone may further observe areas that may not necessarily be restricted but are nevertheless undesirable to enter. For example, the drone may observe a high concentration of air traffic (e.g., other drones) in a particular airspace, which could warrant a temporary flight restriction for other drones that may be implemented in an updated blacklist. As another example, a drone may experience connectivity issues in a particular area, such as from too many drones nearby or other devices causing interference, weak WWAN (wireless wide area network) link, etc., and such information may be distributed to drones via an updated blacklist. As another, a drone may observe the presence of hazards (e.g., storm system, persistent winds, physical or electronic drone attacks, etc.), and other drones may be informed of such hazards through distribution of an updated blacklist.

In various embodiments, drone access to a restricted area may be allowed through modification of restrictions (e.g., access level increased, restriction decreased, and/or conditional access ignored) during exigent circumstances (e.g., emergency, weather). Drone access to a restricted area may also be allowed when problems are encountered with drone. For example, during an emergency, such as a bad weather event, a payload issue (e.g., time sensitive payload, payload weight, payload characteristic, etc.), or when the drone has insufficient energy to take corrective action, a drone may land in a restricted or blacklisted area. In such situations, a controlled landing in a restricted area may be preferable to a non-controlled landing elsewhere. There may be other occasions when the drone may "ignore" access restrictions including conditional access restrictions. A drone may decide not divert from a restricted or blacklisted area based on the amount of time the drone is in, or is expected to be in, the restricted area. For example, if a flight path through a restricted area or portion thereof requires the drone to be in the restricted area for a short period of time (e.g., 1 minute or less), the drone may be allowed to fly through the restricted area or the portion of the restricted area. A drone may change its operation based on a given amount of time to traverse a restricted area or portion of the restricted area (e.g., drone flies faster at a higher fuel cost). A drone processor may determine whether the amount of permitted access time is sufficient for the drone to pass through the restricted area. If the drone processor determines that the permitted access time is insufficient to traverse the restricted area or portion thereof, the drone may navigate around restricted area.

In various embodiments, drones may be configured to relay information received from beacons to other nearby drones, or to a server so that the information can be propagated to other drones that have yet to encounter the beacon. Such observations may be used to update blacklist contents, which may be provided to other drones as described. Similarly, a drone may relay any similar information to the server associated with areas that are not specifically blacklisted (e.g., by a third party or agency), but are nevertheless not desirable for drone travel based on the existence of hazards or other undesirable circumstances.

In various embodiments, a drone (e.g., drone 100, 100a, 100b, 371, 373, 375, 381, 383, 385, 387 in FIGS. 1-4C) may be configured with a unique identifier (ID). The unique ID may allow the drone to be identified by network components, such as servers (e.g., server 240 in FIGS. 2A-2C, 3C-4C), beacons (e.g., beacon 215 in FIGS. 3A-3E and 4C), other drones, and so on. In addition, the access levels for conditional access may be stored in a memory of the drone, on the server, the beacon device, etc. The server and/or beacon device, or other network component, or possibly other drone, may cross reference the access level with the drone unique ID. Cross-referencing of the drone unique ID may also be used when conducting payment transactions.

With reference to FIGS. 1-1A-6D, as described, in various embodiments, conditional access restrictions and other access parameters, (e.g., drone access level) may change over time. In various embodiments, the access level of a drone can be modified based on factors including experience and/or operating history of the drone operator, level of liability coverage for the drone operator, authentication/certification, etc. For example, the access level of the drone may be established based the operator's experience level, such as based on the length of time the drone has been operational, the distance flown by the drone (over the drone lifetime), cumulative criteria (e.g., total flights), etc. Further, the access level may be raised or lowered based on a maintenance history of the drone, such as the number of operational hours since the last maintenance availability, a history of component failures, the total hours flown for the drone, etc.

In further embodiments, the access level of the drone may be based on the payment of additional fees. For example, the drone may gain a certain access level based on payment of a one-time fee by the drone operator. Alternatively or additionally, the drone operator may pay a subscription or license fee for certain access levels. Further, the drone operator may pay a per-use fee (e.g., toll) as described.

In some embodiments, access levels may be variable across areas and one drone may have more than one access level. In other words, a drone operator may pay for a first access level for one area or areas and pay for a second different access level for a different area or areas.

Access levels may be assigned to drones based on the level of insurance carried by the drone operator. For example, drones with sufficient liability insurance (e.g., verifiable levels) may be assigned higher access levels than drones without sufficient liability insurance. In some embodiments, a drone operator may maintain payment information, such as credit card payment information, on file for drone operation to cover liability for drone damage.

Alternatively or additionally, access levels may be based on authentication. For example, operators (e.g., drone operator) may authenticate themselves through an identification such as a government ID, a state license, a drone license, etc. Authentication may further be based on an authentication key that may generally be tied directly or indirectly to other identification information.

In some embodiments, access levels may be based on a drone's or a drone operator's certification. For example, a drone and/or a drone operator may be certified by an agency or third party to fly drones in particular areas, for various permitted uses, or under specified conditions. In some embodiments, the drone may require a certification such as an inspection, certification of airworthiness, certificate of maintenance, etc. In some embodiments, separate access levels may be assigned to drones and to drone operators. For example, a registered drone operator may have a relatively higher access level (e.g., access level 8) as compared to an unregistered operator, which may have a relatively lower access level (e.g., access level 5). For example, a first operator with an access level 8 may operate a drone in areas limited to access level 8 (or higher) drones, but an unregistered operator borrowing the same drone may be limited to operating the same drone in areas limited to access level 5 (or higher) drones. Thus, the access level assigned to drones for purposes of conditional access to restricted areas may be that of the operator controlling the drone (in addition to or alternative of an access level of the drone).

Operator access levels may be assigned to individual operators based on various criteria. For example, an operator with more experience, higher certification levels, and purchasing supplementary liability insurance may be assigned a high access level, which may impact an overall access level for a drone under the control of that operator. Experience levels may be established and/or confirmed using demonstrated experience, or observations of the operator operating a drone or simulation (i.e., flight certification). For example, a certifying agency may operate a simulator that evaluates an operator performing specific tasks, such as drone operation and control or usage, specific drone tasks/missions, response to equipment failures, etc. Based on the performance in the simulation environments, experience levels may be earned, which may lead to increased access levels. As the operator access levels are increased, additional access features and capabilities may be provided to the drone operator.

Thus, in some embodiments, an access level may be established or assigned for an operator of a drone, which may be in addition to access levels established or assigned to drone. Thus, the same drone operated by different operators may have different access levels. For example, a first operator having an access level 2 operating a drone having an access level 5 may result in the drone being assigned a total Access Level 7 while in flight. In this example, the access level is established as a cumulative sum; however, a combined access level for a drone may be calculated in any manner. For example, a combined access level for a drone and operator may be the highest value of the two access levels, the lowest value of the two access levels, the average of the two access levels, or other formula for combining drone and operator access levels.

In some embodiments, drone operators may also be assigned a unique ID alternative to or in addition to a unique drone ID as discussed above, an operator ID may be assigned for each drone operator. Once an operator ID is established, the access level of the operator may be cross referenced with the operator ID stored on the server. The access level operator ID cross-reference may be used to gain access to restricted areas as described. The server may maintain and update changes in the experience levels of operators (e.g., linked to their IDs) obtained through demonstrations and/or simulator performance and related increases in access levels.

As discussed, a drone operator and a drone may increase access levels based on factors such as experience, history, insurance coverage, and so on. In various embodiments, access levels may be reduced base on negative factors. For example, access levels for a drone operator and/or a drone may be lowered based on demerits assessed by an authority (e.g., the FAA) for reckless flying or entering restricted airspace without proper authorization. Such demerits may be stored in a database maintained on a server. Other factors that may lower an access level may include a change of drone ownership, a lapse in recent flying experience, an excess of flying, a history of unauthorized entry into restricted areas, (e.g., entry based on insufficient access level), etc.

While some embodiments may not be capable of stopping drone entry into a restrict area or airspace subject to conditional access, a drone operator may be faced with calculating the consequences of improper entry into restricted areas. For example, a drone operator ignoring conditional access restrictions and flying a drone into a restricted area without the proper authorization may receive demerit points, fines, and/or the like that may be tallied in a server operated by an appropriate authority (e.g., the FAA). There may be occasions when entering a restricted airspace will be worth the cost of assessed demerits to the operator, such as in an emergency situation. In some embodiments, an operator may challenge or appeal demerits, such as when a violation occurred through no fault of the operator, such as failed or malfunctioning systems (e.g., failed navigation, interruptions in the control communication channel, severe weather, etc.).

In the various embodiments described above, the drone 100 may gain access to a restricted area based on conditional access restrictions. In some embodiments, a decision to enter the restricted area may be made by the drone 110 (e.g., a processor of the drone 100) based on conditional access information received by the drone 100. For example, the drone 100 receives conditional access information and then determines whether to enter the restricted area. In other embodiments, alternatively or additionally, the decision as to whether the drone may gain access may be made by the server 240 (e.g., the processor of the server 240). For example, the drone 100 may send information (e.g., access level, location, etc.) and the server may make the decision whether the drone 100 may be provided with access. The server 240 may then send a response to the drone 100 as to whether access has been granted or denied.

Figure 7:
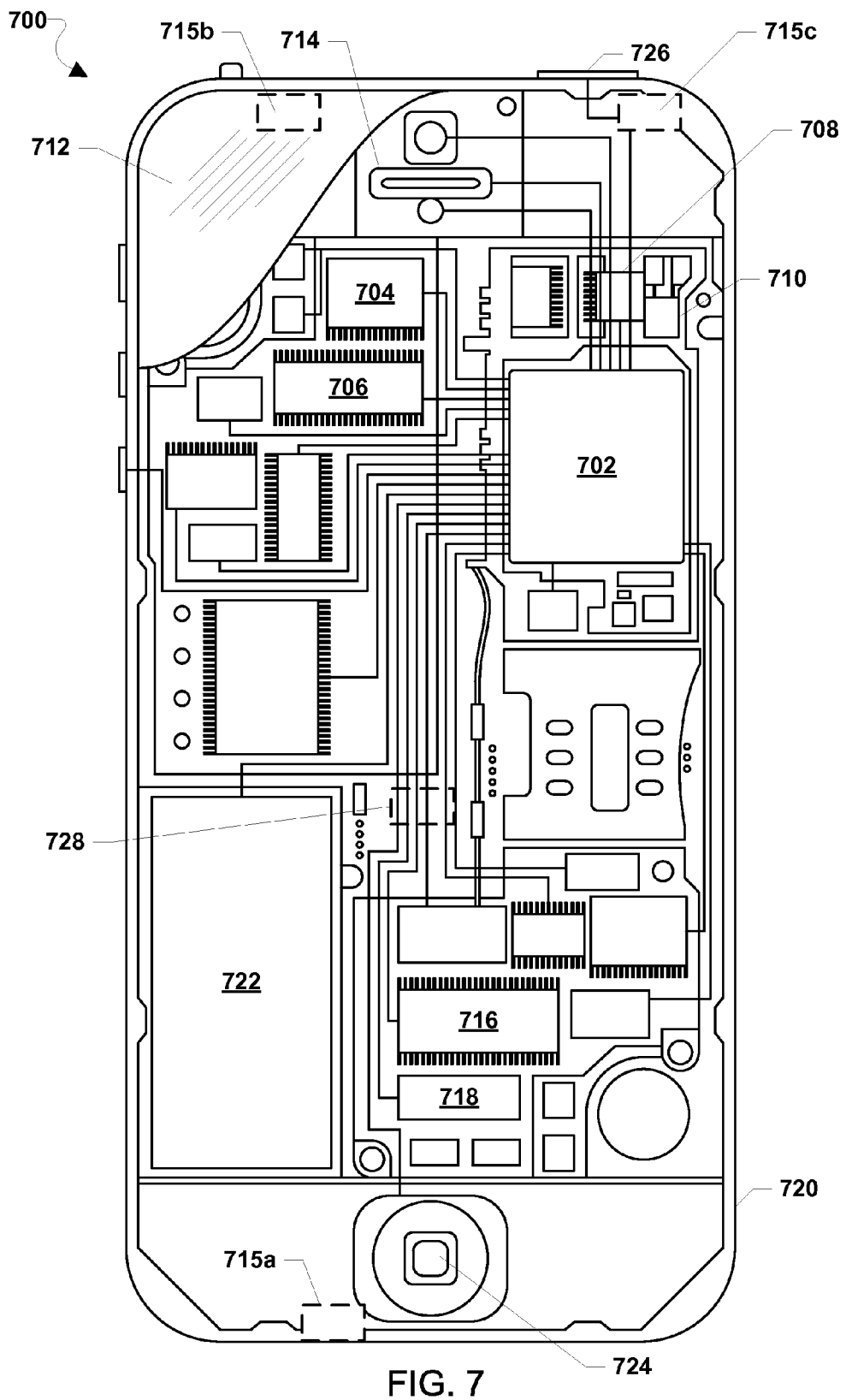
FIG. 7 is a component diagram of an example mobile computing device suitable for use with the various embodiments.

In various embodiments, an operator may control a drone 100, whether communicating through a beacon device, cellular networks, or other communication links, using any of a variety of mobile computing devices (e.g., smartphones, tablets, etc.) an example in the form of a smartphone 700 is illustrated in FIG. 7. The mobile computing device 700 may include a processor 702 coupled to the various systems of the mobile computing device 700. For example, the processor 702 may be coupled to a touch screen controller 704, radio communication elements, speakers and microphones, and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the mobile computing device 700 may also be coupled to an external memory, such as an external hard drive.

The touch screen controller 704 and the processor 702 may also be coupled to a touch screen panel 712, such as a resistive-sensing touch screen, capacitive-sensing touch screen, infrared sensing touch screen, etc. Additionally, the display of the mobile computing device 700 need not have touch screen capability. The mobile computing device 700 may have one or more radio signal transceivers 708 (e.g., Peanut, Bluetooth, Bluetooth LE, Zigbee, Wi-Fi, RF radio, etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

In some embodiments, the mobile computing device 700 may include microphones 715. For example, the mobile computing device may have a conventional microphone 715a for receiving voice or other audio frequency energy from a user during a call. The mobile computing device 700 may further be configured with additional microphones 715b and 715c, which may be configured to receive audio including ultrasound signals. Alternatively, all microphones 715a, 715b, and 715c may be configured to receive ultrasound signals. The microphones 715 may be piezo-electric transducers, or other conventional microphone elements. Because more than one microphone 715 may be used, relative location information may be received in connection with a received ultrasound signal through various triangulation methods. At least two microphones 715 configured to receive ultrasound signals may be used to generate position information for an emitter of ultrasound energy.

The mobile computing device 700 may also include speakers 714 for providing audio outputs. The mobile computing device 700 may also include a housing 720, constructed of a plastic, metal, or a combination of materials, for containing all or some of the components discussed herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

In some embodiments, the mobile computing device 700 may further include an accelerometer 728, which senses movement, vibration, and other aspects of the device through the ability to detect multi-directional values of and changes in acceleration. In the various embodiments, the accelerometer 728 may be used to determine the x, y, and z positions of the mobile computing device 700. Using the information from the accelerometer, a pointing direction of the mobile computing device 700 may be detected.

Figure 8:
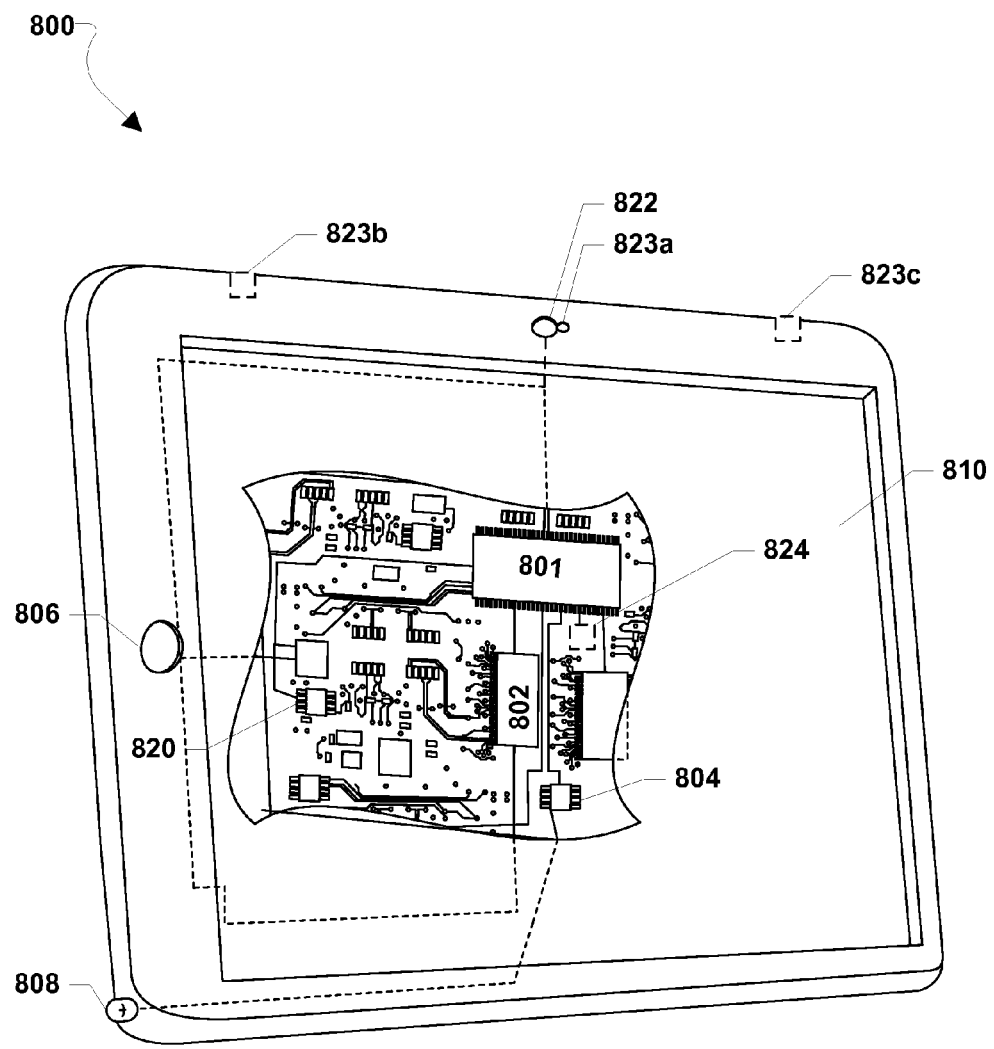
FIG. 8 is a component diagram of an example mobile computing device suitable for use with the various embodiments.
Figure 9:
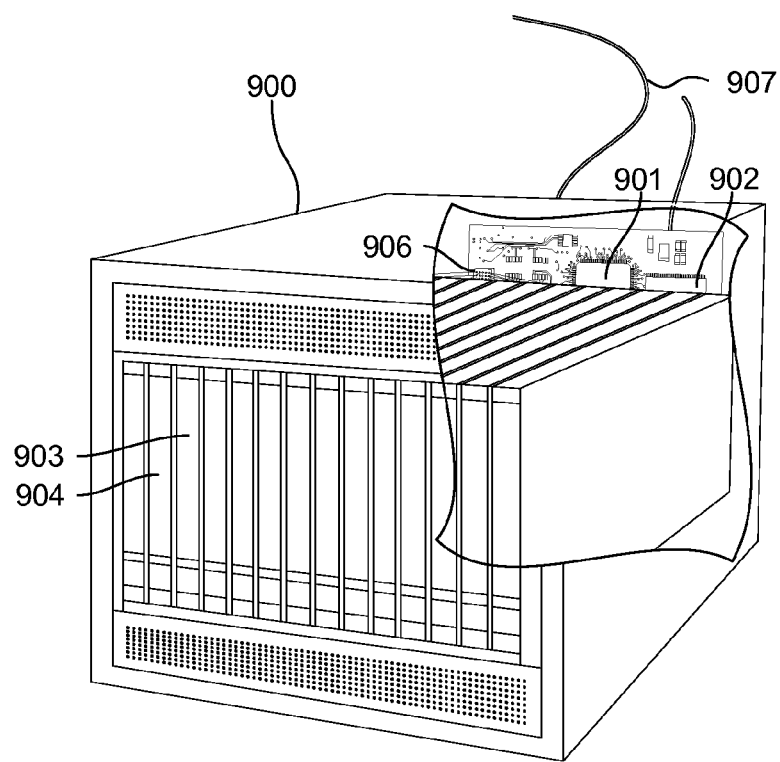
FIG. 9 is a component diagram of an example server suitable for use with the various embodiments.

The various embodiments may be implemented in any of a variety of tablet mobile computing devices, an example of which (800) is illustrated in FIG. 8. For example, a tablet mobile computing device 800 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touch screen display 810, such as a resistive-sensing touch screen, capacitive-sensing touch screen infrared sensing touch screen, etc. The tablet mobile computing device 800 may have one or more radio signal transceivers 804 (e.g., Peanut, Bluetooth, Zigbee, WiFi, RF radio) and antennas 808 for sending and receiving wireless signals as described herein. The transceivers 804 and antennas 808 may be used with the above-mentioned circuitry to implement the various wireless transmission protocol stacks and interfaces. The tablet mobile computing device 800 may include a cellular network wireless modem chip 820 that enables communication via a cellular network. The tablet mobile computing device 800 may also include a physical button 806 for receiving user inputs. The tablet mobile computing device 800 may also include various sensors coupled to the processor 801, such as a camera 822, a microphone or microphones 823, and an accelerometer 824.

For example, the tablet mobile computing device 800 may have a conventional microphone 823a for receiving voice or other audio frequency energy from a user during a call or other voice frequency activity. The tablet mobile computing device 800 may further be configured with additional microphones 823b and 823c, which may be configured to receive audio including ultrasound signals. Alternatively, all microphones 823a, 823b, and 823c may be configured to receive ultrasound signals. The microphones 823 may be piezo-electric transducers, or other conventional microphone elements. Because more than one microphone 823 may be used, relative location information may be received in connection with a received ultrasound signal through various methods such as time of flight measurement, triangulation, and similar methods. At least two microphones 823 that are configured to receive ultrasound signals may be used to generate position information for an emitter of ultrasound energy.

Also in some embodiments, the tablet mobile computing device 800 may further include the accelerometer 824, which senses movement, vibration, and other aspects of the tablet mobile computing device 800 through the ability to detect multi-directional values of and changes in acceleration. In the various embodiments, the accelerometer 824 may be used to determine the x, y, and z positions of the tablet mobile computing device 800. Using the information from the accelerometer 824, a pointing direction of the tablet mobile computing device 800 may be detected.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing access for a drone to an area of restricted air space ("restricted area") by a beacon device, comprising:
    transmitting, by the beacon device, beacon signals including access information associated with the drone accessing the restricted area;
    receiving, by the beacon device, one or more access parameters associated with the drone;
    determining, by the beacon device, a clearance for the drone to access the restricted area based on comparing the received one or more access parameters associated with the drone and the access information transmitted in the beacon signals; and
    transmitting a signal from the beacon device to the drone indicating the determined clearance for accessing the restricted area, comprises:
        transmitting an access approved notification from the beacon device to the drone when the determined clearance permits the drone access to the restricted area; and
        transmitting an access denied notification from the beacon device to the drone when the determined clearance does not permit the drone access to the restricted area, wherein the access denied notification includes information for the drone to take a corrective action.

2. The method of claim 1, wherein transmitting, by the beacon device, beacon signals including access information associated with the drone accessing the restricted area comprises receiving, by the beacon device from a server, at least the access information associated with the restricted area.

3. The method of claim 1, wherein receiving, by the beacon device, one or more access parameters associated with the drone comprises receiving, by the beacon device, at least the one or more access parameters from a server associated with the drone.

4. The method of claim 1, wherein the information for the drone to take the corrective action comprises at least one of: an instruction to land in or move to a designated area; an instruction to proceed along a designated flight path to avoid the restricted area; an instruction to return to a designated location; an instruction to prevent takeoff; an instruction to revert control of the drone to a third party; an instruction to restrict usage of the drone while in the restricted area; or an instruction to wait for a period of time.

5. The method of claim 1, wherein the beacon signals define a boundary profile of the restricted area.

6. The method of claim 1, wherein the access information comprises additional information including one or more of: boundary information; time-based access restriction information; restriction level information; suggested route information; suggested corrective action information; suggested alternative route information; use restriction information; or toll payment information.

7. The method of claim 1, wherein determining, by the beacon device, the clearance for the drone to access the restricted area based on comparing the received one or more access parameters for the drone and the access information transmitted in the beacon signals comprises:
    receiving, by the beacon device, toll payment information from the drone; and
    processing, by the beacon device, the toll payment information,
    wherein transmitting the signal from the beacon device to the drone indicating the determined clearance for accessing the restricted area comprises transmitting a signal from the beacon device to the drone permitting access to the restricted area in response to successful processing of a toll payment.

8. The method of claim 7, wherein processing, by the beacon device, the toll payment information comprises:
forwarding, by the beacon device, the toll payment information to a server; and
receiving, by the beacon device from the server, a processing result of the toll payment information processing performed in the server.

9. The method of claim 1, wherein the one or more access parameters associated with the drone comprises at least one of a drone access level, a drone toll payment, a drone identification, a drone authentication, or a drone capability.

10. The method of claim 1, wherein the access information comprises conditional access restrictions.

11. The method of claim 10, wherein the conditional access restrictions comprise at least one of: a drone access level restriction; a drone toll payment restriction; a time-based restriction; a drone identification restriction; a drone authentication restriction; a drone use restriction; a drone speed restriction; or a drone altitude restriction.

12. The method of claim 1, wherein:
determining, by the beacon device, the clearance for the drone to access the restricted area based on comparing the received one or more access parameters associated with the drone and the access information transmitted in the beacon signals comprises determining, by the beacon device, a clearance for the drone to access the restricted area based on comparing a drone access level included in the received one or more access parameters associated with the drone with a drone access level restriction included in the access information; and
transmitting the signal from the beacon device to the drone indicating the determined clearance for accessing the restricted area, comprises:
transmitting an access approved notification from the beacon device to the drone when the determined clearance permits the drone access to the restricted area based on the comparison indicating the drone access level is equal to or higher than the drone access level restriction; and
transmitting an access denied notification from the beacon device to the drone when the determined clearance denies the drone access to the restricted area based on the comparison indicating the drone access level is lower than the drone access level restriction.

13. The method of claim 1, wherein the one or more access parameters associated with the drone comprise a conditional access level that is based on one or more of a capability of the drone, a qualification of the drone, an identity of an operator of the drone, a qualification of the operator of the drone, an experience level of the operator of the drone, or a maintenance history of the drone.

14. The method of claim 1, wherein the one or more access parameters associated with the drone comprise a conditional access level that is based on both an access level assigned to the drone and to an access level assigned to an operator of the drone.

15. A method for obtaining access by a drone to an area of restricted air space ("restricted area"), comprising:
receiving, by the drone, beacon signals from a beacon device associated with the restricted area, the beacon signals including access information associated with the restricted area;
comparing, by the drone, the received access information for the restricted area to one or more access parameters for the drone;
accessing the restricted area by the drone based on a result of comparing the received access information and the one or more access parameters for the drone; and
taking corrective action when the received access information does not permit the drone access to the restricted area based on the one or more access parameters for the drone.

16. The method of claim 15, wherein comparing, by the drone, the received access information for the restricted area to one or more access parameters for the drone comprises receiving, from a server associated with the drone, the result of comparing the received access information and the one or more access parameters for the drone performed in the server associated with the drone.

17. The method of claim 15, wherein comparing, by the drone, the received access information for the restricted area to one or more access parameters for the drone comprises:
comparing a restriction level in the received access information with an access level assigned to the drone;
accessing the restricted area when the access level assigned to the drone is equal to or higher than the restriction level based on comparing the restriction level with the access level assigned to the drone; and
taking corrective action by the drone when the access level assigned to the drone is less than the restriction level based on comparing the restriction level with the access level assigned to the drone.

18. The method of claim 17, wherein the corrective action comprises at least one of: landing in or moving to a designated area; proceeding along a designated path to avoid the restricted area; returning to a designated location; preventing takeoff; reverting control of the done to a third party; restricting usage of the drone while in the restricted area; or waiting for a period of time.

19. The method of claim 15, wherein:
receiving, by the drone, beacon signals including access information associated with the restricted area comprises receiving a restriction level in the received access information that is changeable between a first restriction level and a second restriction level; and
accessing the restricted area by the drone based on comparing the received conditional access information and the one or more access parameters for the drone comprises accessing the restricted area when the restriction level is changed to the first level, and not accessing the restricted area when the restriction level is changed to the second level.

20. The method of claim 15, wherein the corrective action comprises at least one of: landing in or moving to a designated area; proceeding along a designated path to avoid the restricted area; returning to a designated location; preventing takeoff; reverting control of the done to a third party; restricting usage of the drone while in the restricted area; or waiting for a period of time.

21. The method of claim 15, wherein the corrective action comprises returning to a designated location.

22. The method of claim 15, wherein accessing the restricted area by the drone based on comparing the received access information and the one or more access parameters for the drone further comprises:
providing, by the drone, toll payment information to one of a server and a beacon device;

receiving, by the drone, a confirmation of a toll payment with the toll payment information from the one of the server and the beacon device; and accessing the restricted area by the drone based on the received confirmation of the toll payment.

23. The method of claim 15, wherein the one or more access parameters for the drone comprises at least one of: a drone access level; a drone toll payment; a drone identification; a drone authentication; or a drone capability.

24. The method of claim 15, wherein the access information comprises at least one of: a restriction level; a drone toll payment restriction; a time-based restriction; a drone identification restriction; a drone authentication restriction; a drone use restriction; a drone speed restriction; or a drone altitude restriction.

25. A beacon device, comprising:
a transceiver; and
a processor configured with processor-executable instructions to:
   transmit beacon signals including access information associated with a drone accessing a restricted area;
   receive one or more access parameters associated with the drone;
   determine a clearance for the drone to access the restricted area based on comparing the received one or more access parameters associated with the drone and the transmitted access information; and
   transmit a signal to the drone indicating the determined clearance for accessing the restricted area, comprises:
      transmit an access approved notification from the beacon device to the drone when the determined clearance permits the drone access to the restricted area; and
      transmit an access denied notification from the beacon device to the drone when the determined clearance does not permit the drone access to the restricted area, wherein the access denied notification includes information for the drone to take a corrective action.

26. A drone, comprising:
a transceiver; and
a processor configured with processor-executable instructions for:
   receiving beacon signals from a beacon device associated with the restricted area, the beacon signals including access information associated with the restricted area;
   comparing the received access information for the restricted area to one or more access parameters for the drone;
   accessing the restricted area by the drone based on a result of comparing the received access information and the one or more access parameters for the drone, and
   taking corrective action when the received access information does not permit access to the restricted area based on the one or more access parameters for the drone.

* * * * *